United States Patent
Hayashi et al.

(10) Patent No.: US 11,360,926 B2
(45) Date of Patent: Jun. 14, 2022

(54) CONFIGURATION MANAGEMENT DEVICE, CONFIGURATION MANAGEMENT SYSTEM, CONFIGURATION MANAGEMENT METHOD, AND NON-TRANSITORY COMPUTER READABLE STORAGE MEDIUM

(71) Applicant: NEC Corporation, Tokyo (JP)

(72) Inventors: Yuki Hayashi, Tokyo (JP); Jun Suzuki, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/769,733

(22) PCT Filed: Dec. 14, 2018

(86) PCT No.: PCT/JP2018/046128
§ 371 (c)(1),
(2) Date: Jun. 4, 2020

(87) PCT Pub. No.: WO2019/124259
PCT Pub. Date: Jun. 27, 2019

(65) Prior Publication Data
US 2021/0173805 A1  Jun. 10, 2021

(30) Foreign Application Priority Data
Dec. 20, 2017  (JP) .............................. JP2017-243744

(51) Int. Cl.
*G06F 13/40* (2006.01)
*G06F 13/10* (2006.01)
*G06F 13/24* (2006.01)

(52) U.S. Cl.
CPC ........ *G06F 13/4081* (2013.01); *G06F 13/105* (2013.01); *G06F 13/24* (2013.01); *G06F 13/4027* (2013.01); *G06F 2213/0058* (2013.01)

(58) Field of Classification Search
CPC .. G06F 12/24; G06F 13/4081; G06F 13/4027; G06F 2213/0058; G06F 13/105
See application file for complete search history.

(56) References Cited

U.S. PATENT DOCUMENTS 9,294,282 B1 * 3/2016 Potlapally ............. H04L 9/3242
9,348,396 B2 * 5/2016 Higuchi ................ G06F 1/3278
(Continued)

FOREIGN PATENT DOCUMENTS

| JP | 2008-46722 A | 2/2008 |
| JP | 2016-527764 A | 9/2016 |
| WO | 2015/190079 A1 | 12/2015 |

OTHER PUBLICATIONS

"PCI Express Base Specification Revision 2.1", PCI-SIG Mar. 4, 2009 (720 pages total).
(Continued)

*Primary Examiner* — Henry Tsai
*Assistant Examiner* — Christopher A Daley
(74) *Attorney, Agent, or Firm* — Sughrue Mion, PLLC

(57) ABSTRACT

A configuration management device provided with: a configuration storage means for storing a bridge that includes a virtual bridge and the configuration information of input/output devices; a bus recognition means for reading the configuration information of input/output devices connected to the bridge from the input/output devices and storing the read information in the configuration storage means; a virtual resource definition storage means for defining a virtual connection between the input/output devices connected to a connection means that is not the bridge and the virtual bridge; and a device access transfer means for receiving a configuration information read request for input/output devices connected to the virtual bridge that is transmitted by the bus recognition means, reading the configuration information from the input/output devices the virtual
(Continued)

connection of which is defined, and transmitting the read configuration information to the bus recognition means.

7 Claims, 19 Drawing Sheets

(56) References Cited

U.S. PATENT DOCUMENTS

| | | |
|---|---|---|
| 10,419,344 B2 * | 9/2019 | He .................... H04L 49/90 |
| 10,423,437 B2 * | 9/2019 | Kaplan ............ G06F 9/45558 |
| 2008/0040526 A1 | 2/2008 | Suzuki et al. |
| 2009/0265501 A1 * | 10/2009 | Uehara ............ G06F 11/2033 |
| | | 710/312 |
| 2013/0034094 A1 * | 2/2013 | Cardona ............. H04L 49/70 |
| | | 370/360 |
| 2013/0034109 A1 * | 2/2013 | Cardona ......... H04L 12/4633 |
| | | 370/419 |
| 2013/0160002 A1 * | 6/2013 | Graham ........... G06F 9/45558 |
| | | 718/1 |
| 2014/0281104 A1 | 9/2014 | Raskin |
| 2014/0376548 A1 | 12/2014 | Naven et al. |
| 2015/0036692 A1 * | 2/2015 | Kirscht ................ H04L 45/70 |
| | | 370/412 |
| 2015/0098476 A1 * | 4/2015 | Reese ................... H04L 43/08 |
| | | 370/401 |
| 2017/0116151 A1 | 4/2017 | Takahashi |
| 2017/0147374 A1 * | 5/2017 | Tsirkin ............. G06F 9/45558 |
| 2017/0147378 A1 * | 5/2017 | Tsirkin ............. G06F 9/45558 |
| 2018/0189206 A1 * | 7/2018 | Lee .................... G06F 13/1684 |

OTHER PUBLICATIONS

Suzuki et al., "ExpressEther—Ethernet-Based Virtualization Technology for Reconfigurable Hardware Platform", Proceedings of the 14th IEEE Symposium on High-Performance Interconnects (HOTI'06), Aug. 2006, pp. 45-51 (7 pages total).

International Search Report dated Mar. 19, 2019 in International Application No. PCT/JP2018/046128.

Written Opinion of the International Searching Authority dated Mar. 19, 2019 in International Application No. PCT/JP2018/046128.

* cited by examiner

Fig.3

CONFIGURATION STORAGE UNIT ~15

| BUS (B) | DEVICE (D) | FUNCTION (F) | DEVICE INFORMATION | EMPTY SLOT |
|---|---|---|---|---|
| 00 | 00 | 0 | BRIDGE A – UPSTREAM BRIDGE | – |
| 01 | 00 | 0 | BRIDGE A – DOWNSTREAM BRIDGE A | 0 |
| 01 | 01 | 0 | NIC | – |
| 01 | 02 | 0 | BRIDGE A – DOWNSTREAM BRIDGE B | 0 |
| 01 | 03 | 0 | BRIDGE B – UPSTREAM BRIDGE | – |
| 02 | 00 | 0 | BRIDGE B – DOWNSTREAM BRIDGE A | 0 |
| 02 | 01 | 0 | INPUT/OUTPUT DEVICE B | – |

Fig.8

| BUS | DEVICE | FUNCTION | DEVICE INFORMATION | EMPTY SLOT |
|---|---|---|---|---|
| 00 | 00 | 0 | BRIDGE A – UPSTREAM BRIDGE | - |
| 01 | 00 | 0 | BRIDGE A – DOWNSTREAM BRIDGE A | 0 |
| 01 | 01 | 0 | NIC | - |
| 01 | 02 | 0 | BRIDGE A – DOWNSTREAM BRIDGE B | 0 |
| 01 | 03 | 0 | BRIDGE B – UPSTREAM BRIDGE | - |
| 02 | 00 | 0 | BRIDGE B – DOWNSTREAM BRIDGE A | 1 |

BRIDGE INFORMATION TABLE ~1940

| BRIDGE INFORMATION | CONFIGURATION COMPLETE FLAG |
|---|---|
| VIRTUAL BRIDGE – UPSTREAM BRIDGE | 0 |
| VIRTUAL BRIDGE – DOWNSTREAM BRIDGE A | 0 |

Fig.12

DEVICE INFORMATION TABLE ~1941

| CONNECTED BRIDGES | DEVICE NAME | DEVICE BDF NUMBER | NW ADDRESS |
|---|---|---|---|
| VIRTUAL BRIDGE – DOWNSTREAM BRIDGE A | NW INPUT/OUTPUT DEVICE | 04:00.1 | AA:BB:CC:DD:EE:FF |
| ⋮ | ⋮ | ⋮ | ⋮ |

Fig.16

| BUS | DEVICE | FUNCTION | DEVICE INFORMATION | EMPTY SLOT |
|---|---|---|---|---|
| 00 | 00 | 0 | BRIDGE A – UPSTREAM BRIDGE | – |
| 01 | 00 | 0 | BRIDGE A – DOWNSTREAM BRIDGE A | 0 |
| 01 | 01 | 0 | NIC | – |
| 01 | 02 | 0 | BRIDGE A – DOWNSTREAM BRIDGE B | 0 |
| 01 | 03 | 0 | BRIDGE B – UPSTREAM BRIDGE | – |
| 02 | 00 | 0 | BRIDGE B – DOWNSTREAM BRIDGE A | 0 |
| 02 | 01 | 0 | INPUT/OUTPUT DEVICE B | – |
| 02 | 02 | 0 | BRIDGE B – VIRTUAL DOWNSTREAM BRIDGE B | – |
| 02 | 03 | 0 | VIRTUAL BRIDGE – UPSTREAM BRIDGE | – |
| 03 | 00 | 0 | VIRTUAL BRIDGE – DOWNSTREAM BRIDGE A | 1 |

Fig.17

| BUS | DEVICE | FUNCTION | DEVICE INFORMATION | EMPTY SLOT |
|---|---|---|---|---|
| 00 | 00 | 0 | BRIDGE A – UPSTREAM BRIDGE | – |
| 01 | 00 | 0 | BRIDGE A – DOWNSTREAM BRIDGE A | 0 |
| 01 | 01 | 0 | NIC | – |
| 01 | 02 | 0 | BRIDGE A – DOWNSTREAM BRIDGE B | 0 |
| 01 | 03 | 0 | BRIDGE B – UPSTREAM BRIDGE | – |
| 02 | 00 | 0 | BRIDGE B – DOWNSTREAM BRIDGE A | 0 |
| 02 | 01 | 0 | INPUT/OUTPUT DEVICE B | – |
| 02 | 02 | 0 | BRIDGE B – DOWNSTREAM BRIDGE B | – |
| 03 | 03 | 0 | VIRTUAL BRIDGE – UPSTREAM BRIDGE | – |
| 04 | 00 | 0 | VIRTUAL BRIDGE – DOWNSTREAM BRIDGE A | 0 |
| 04 | 01 | 0 | INPUT/OUTPUT DEVICE A | – |

~15

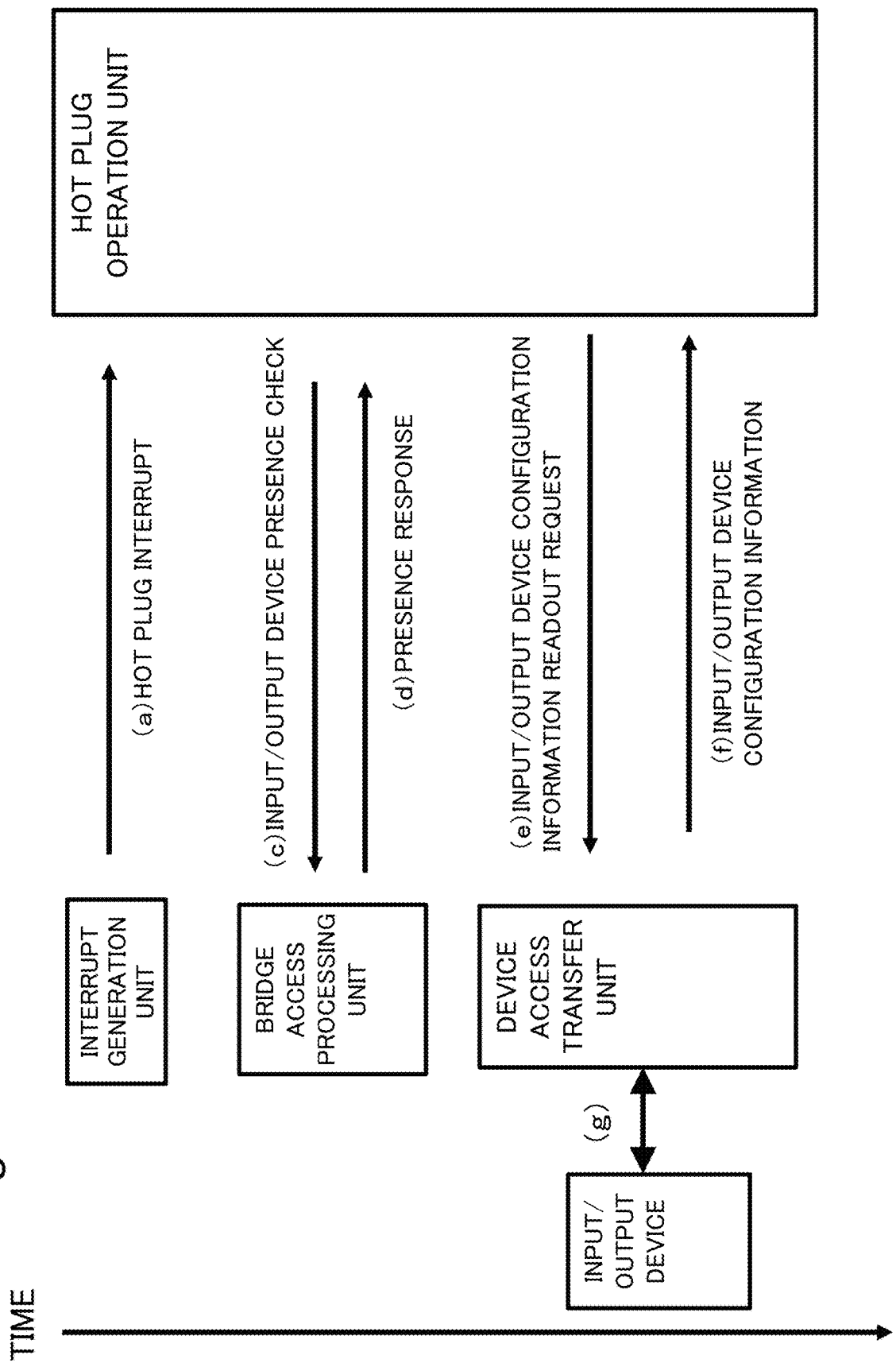

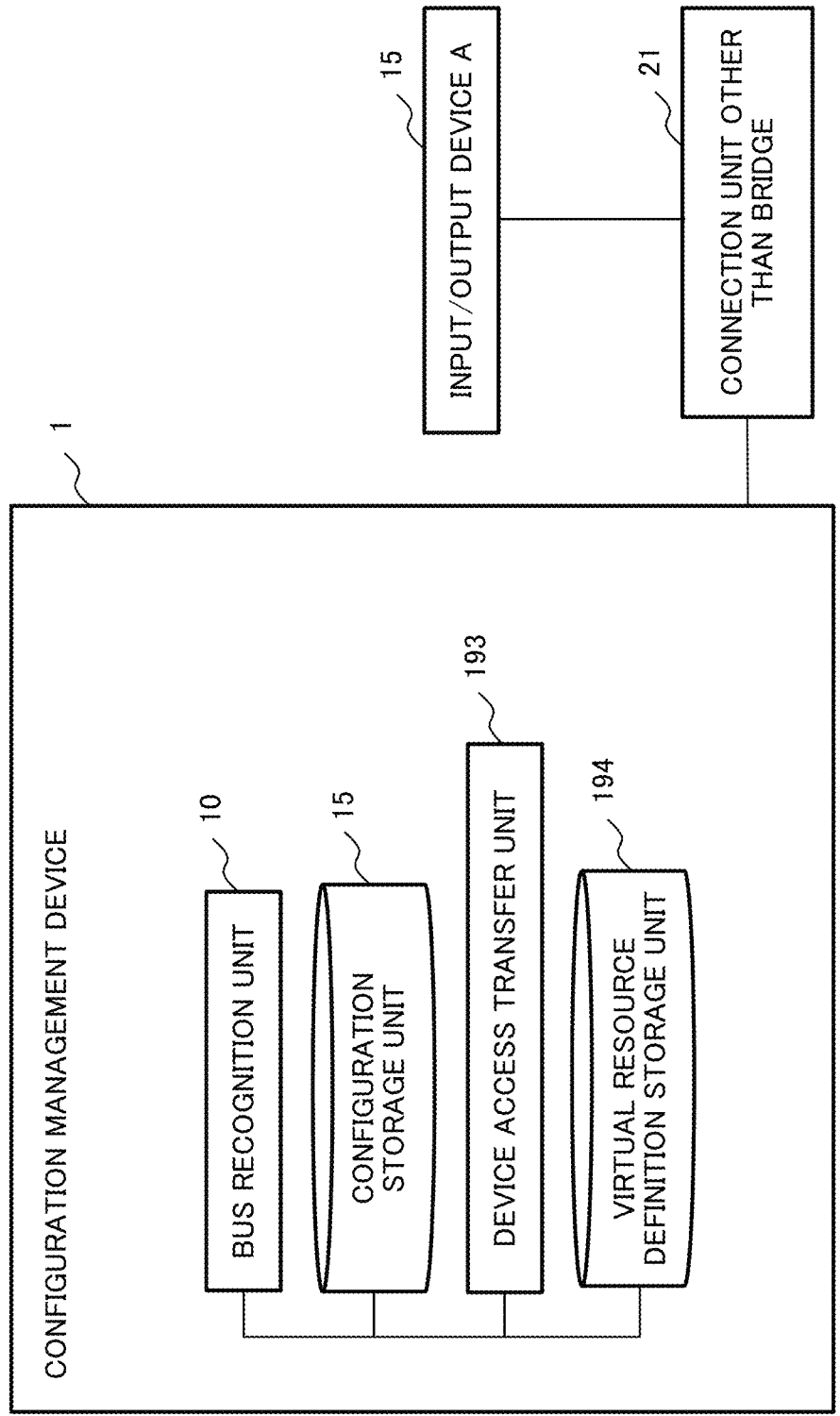

CONFIGURATION MANAGEMENT DEVICE, CONFIGURATION MANAGEMENT SYSTEM, CONFIGURATION MANAGEMENT METHOD, AND NON-TRANSITORY COMPUTER READABLE STORAGE MEDIUM

This application is a National Stage Entry of PCT/JP2018/046128 filed on Dec. 14, 2018, which claims priority from Japanese Patent Application 2017-243744 filed on Dec. 20, 2017, the contents of all of which are incorporated herein by reference, in their entirety.

TECHNICAL FIELD

The present invention relates to a configuration management device, a configuration management system, a configuration management method, and a configuration management program, particularly to those that can execute configuration control of an input/output device connected to a connection means other than a bridge and an input/output device connected to a bridge in a similar way.

BACKGROUND ART

For example, in a computer system, a computer bus such as PCI Express (registered trademark) is widely used for a connection between a central processing unit (CPU) and an input/output device, as disclosed in NPL 1. Herein, the input/output device is, for example, an external device of a computer, such as a solid state drive (SSD), a graphics processing unit (GPU), and a network interface card (NIC). The computer bus is configured by connecting the input/output device with a device (called a bridge) having a role similar to a switch hierarchically managing the computer bus, in a tree structure with the CPU as a root.

NPL 2 discloses a technology such as PCI Express over Ethernet (registered trademark). PCI Express over Ethernet is a technology for encapsulating PCI Express (registered trademark) being a standard for a computer bus, by using a network packet. In this technology, a function of bridging and a function of encapsulating a PCI Express packet in Ethernet are imparted to a computer and an input/output device on a network, and thereby a bridging function is emulated in the network.

In a computer system having these computer buses, software running on the computer needs to execute input/output from/to an input/output device on the computer bus. Further, the software needs to recognize a configuration of the computer bus in order to perform another operation and the like.

CITATION LIST

Non Patent Literature

[NPL 1] "PCI Express Base Specification Revision 2.1", PCI-SIG, 2009.
[NPL 2] J. Suzuki et al., "ExpressEther-Ethernet-based virtualization technology for reconfigurable hardware platform," in Proc. IEEE Symposium on High Performance Interconnects (HOTI'06), Stanford, Calif., August 2006, pp. 45 to 51

SUMMARY OF INVENTION

Technical Problem

As configuration control software, some software recognizes a configuration of a computer bus and holds the configuration as configuration information. However, such configuration control software is unable to uniformly treat, for example, a configuration of an input/output device connected to a bridge by using the technology disclosed in NPL 1 and a configuration of an input/output device connected to a network or the like by using the technology disclosed in NPL 2.

An object of the present invention is to provide a configuration management device and the like that can control an input/output device connected to a connection means other than a bridge and an input/output device connected to a bridge by using the same interface.

Solution to Problem

A configuration management device according to one example embodiment of the present invention includes: a configuration storage means for storing configuration information of a bridge including a virtual bridge and of an input/output device; a bus recognition means for reading the configuration information of the input/output device connected to the bridge from the input/output device, and storing the configuration information in the configuration storage means; a virtual resource definition storage means for defining a virtual connection between the virtual bridge and the input/output device connected to a connection means other than the bridge; and a device access transfer means for receiving a read request for the configuration information transmitted by the bus recognition means with respect to the input/output device connected to the virtual bridge, reading the configuration information from the input/output device for which the virtual connection is defined, and transmitting the configuration information to the bus recognition means.

A configuration management method according to one example embodiment of the present invention includes: providing a configuration storage means for storing configuration information of a bridge including a virtual bridge and of an input/output device; providing a bus recognition means for reading the configuration information of the input/output device connected to the bridge from the input/output device, and storing the configuration information in the configuration storage means; defining a virtual connection between the virtual bridge and an input/output device connected to a connection means other than the bridge; and receiving a read request for the configuration information transmitted by the bus recognition means to the input/output device connected to the virtual bridge, reading the configuration information from the input/output device for which the virtual connection is defined, and transmitting the configuration information to the bus recognition means.

A storage medium according to one example embodiment of the present invention stores a configuration management program that causes a computer including a configuration storage means for storing configuration information of a bridge including a virtual bridge and of an input/output device, and a bus recognition means for reading the configuration information of the input/output device connected to the bridge from the input/output device, and storing the configuration information in the configuration storage means, to execute: virtual resource definition storage processing of defining a virtual connection between the virtual bridge and the input/output device connected to a connection means other than the bridge; and device access transfer processing of receiving a read request for the configuration information transmitted by the bus recognition means with respect to the input/output device connected to the virtual bridge, reading the configuration information from the input/ output device for which the virtual connection is defined, and transmitting the configuration information to the bus recognition means.

Advantageous Effects of Invention

According to the configuration management device and the like of the present invention, an input/output device connected to a connection means other than a bridge and an input/output device connected to a bridge can be controlled by using the same interface.

BRIEF DESCRIPTION OF DRAWINGS

FIG. 3 is a diagram illustrating a configuration example of configuration information stored in a configuration storage unit 15.

FIG. 8 is a diagram illustrating configuration information stored in the configuration storage unit 15 and in which the configuration in FIG. 7 is reflected.

FIG. 11 is a diagram illustrating a configuration of a bridge information table 1940 stored in a virtual resource definition storage unit 194.

FIG. 12 is a diagram illustrating a configuration of a device information table 1941 stored in the virtual resource definition storage unit 194.

FIG. 16 illustrates information stored in the configuration storage unit 15 after a virtual bridge is registered by the bus recognition unit 10.

FIG. 17 illustrates information stored in the configuration storage unit 15 after an input/output device A 30 is registered by the bus recognition unit 10.

FIG. 18 is a diagram illustrating exchange of signals between the hot plug operation unit 11 and the bus emulation unit 19.

FIG. 19 is a diagram illustrating a configuration of a configuration management device 1 according to a second example embodiment.

EXAMPLE EMBODIMENT

First Example Embodiment

<Overall Configuration>

Figure 1:
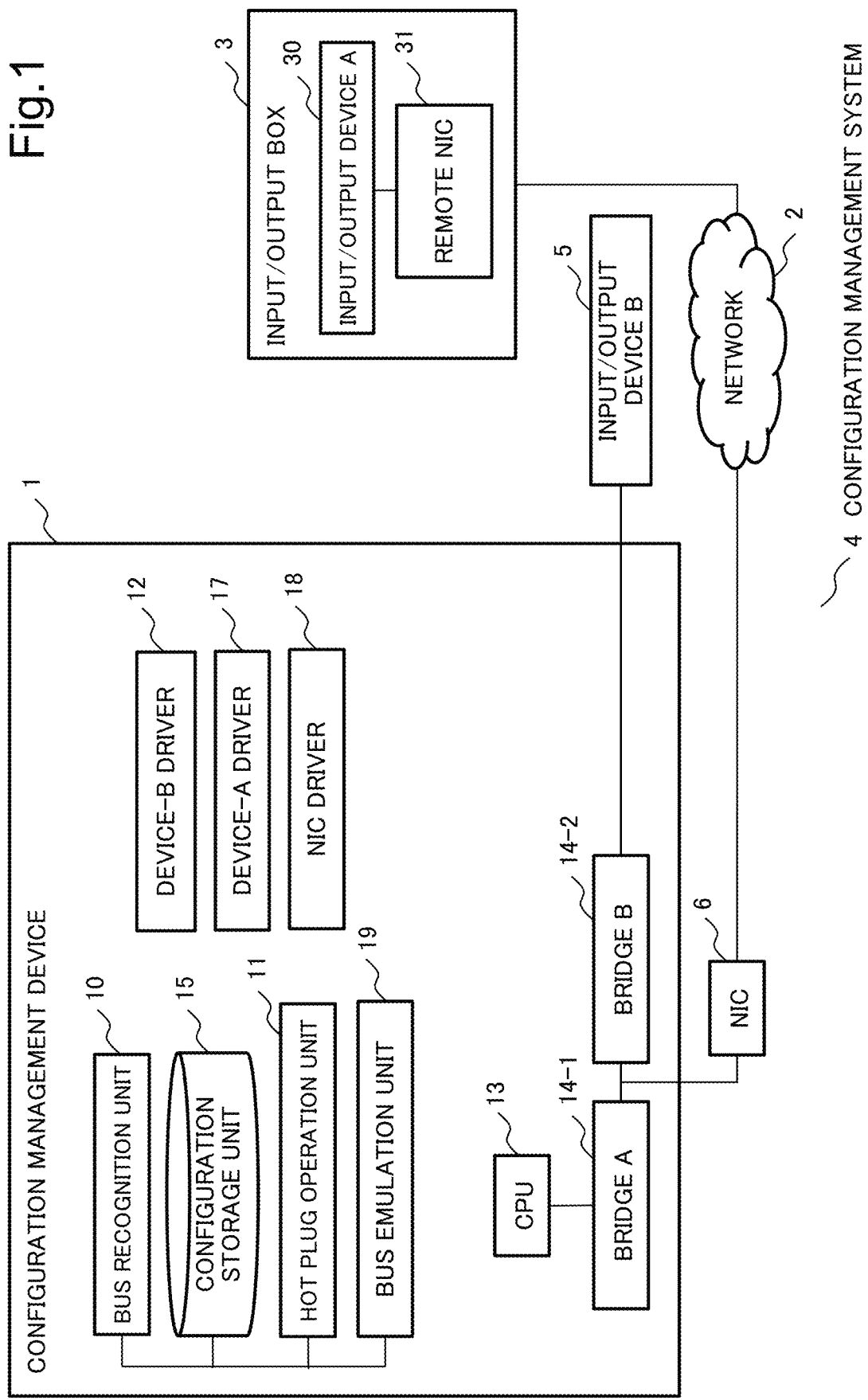
FIG. 1 is a diagram illustrating a configuration example of a configuration management system 4 according to a first example embodiment.

FIG. 1 is a diagram illustrating a configuration example of a configuration management system 4 according to the present example embodiment. The configuration management system 4 includes a configuration management device 1 and an input/output box 3. The configuration management device 1 and the input/output box 3 are connected to each other by a network 2. A plurality of input/output boxes 3 may be connected to the configuration management device 1. The network 2 is, for example, Ethernet (registered trademark), or may be another communication network.

The configuration management device 1 is also a computer, and includes a CPU 13, a bridge A 14-1, and a bridge B 14-2. The bridge A 14-1 is connected to the bridge B 14-2 and an NIC 6. Further, the bridge A 14-1 is connected to the network 2 via the NIC 6. The bridge B 14-2 is connected to an input/output device B 5. In the following description, when the bridge A 14-1 and the bridge B 14-2 are not distinguished from each other, both of the bridges will be collectively indicated as a bridge 14. In the present drawings, identifiers such as A and B are added in order to distinguish between the two bridges.

The configuration management device 1 further includes a bus recognition unit 10, a configuration storage unit 15, a hot plug operation unit 11, a bus emulation unit 19, a device-B driver 12, a device-A driver 17, and a NIC driver 18. The bus recognition unit 10 recognizes a computer bus. Further, the bus recognition unit 10 prepares configuration information of the bridge 14, the input/output device B 5, and the NIC 6 connected to the computer bus, and stores the configuration information in the configuration storage unit 15. The hot plug operation unit 11 executes an insertion/removal operation of the input/output device B 5 during operation of the configuration management device 1. The bus emulation unit 19 emulates, for the bus recognition unit 10 and the hot plug operation unit 11, an input/output device A 30 within the input/output box 3 as if being connected to the bridge 14 included in the configuration management device 1.

The device-B driver 12, the device-A driver 17, and the NIC driver 18 are activated from an application program (not illustrated) executed by the configuration management device 1. Further, the device-B driver 12, the device-A driver 17, and the NIC driver 18 execute input/output to/from the input/output device B 5, the input/output device A 30, and the NIC 6. When executing input/output, the device-B driver 12, the device-A driver 17, and the NIC driver 18 refer to configuration information stored in the configuration storage unit 15.

The bus recognition unit 10, the hot plug operation unit 11, the device-B driver 12, the device-A driver 17, and the NIC driver 18 are a program read and executed by the CPU 13, and are stored in, for example, a memory (not illustrated)

included in the configuration management device 1. The configuration storage unit 15 is, for example, a semiconductor memory device and a hard disk drive (HDD). The bus recognition unit 10, the hot plug operation unit 11, the device-B driver 12, the device-A driver 17, and the NIC driver 18 may be a dedicated processing device or a logic circuitry controlled by firmware. The bus emulation unit 19 will be described later.

The input/output box 3 includes the input/output device A 30 and a remote NIC 31 (also referred to as a remote bridge). The input/output device A 30 is connected to the network 2 via the remote NIC 31. The input/output device A 30 and the input/output device B 5 are devices of the same type.

Figure 2:
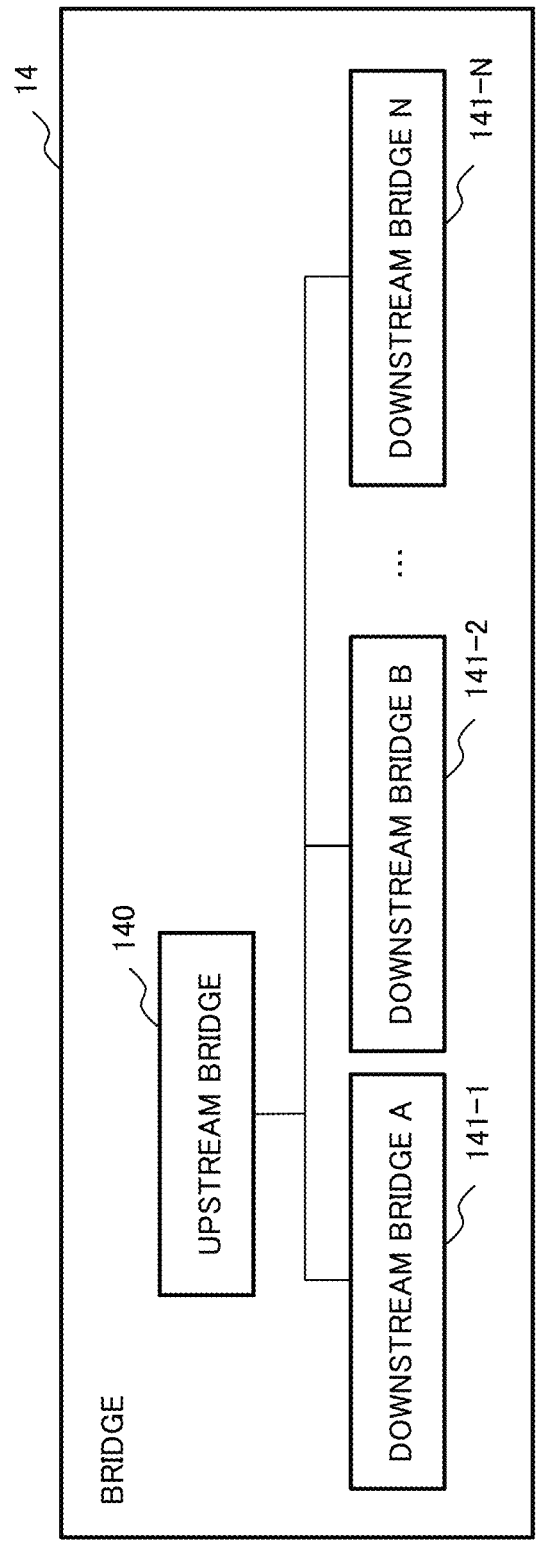
FIG. 2 is a diagram illustrating a configuration of a bridge 14.

FIG. 2 is a diagram illustrating a configuration of the bridge 14. The bridge 14 includes an upstream bridge 140 and a downstream bridge 141. One or more downstream bridges 141 are connected to one upstream bridge 140. FIG. 2 illustrates a case in which N (N is 1 or more) downstream bridges 141 are connected to one upstream bridge 140. In FIG. 2, identification numbers 1 to N of the downstream bridges 141 are given to N downstream bridges 141. N downstream bridges 141 are, for example, a downstream bridge A 141-1, a downstream bridge B 141-2, and a downstream bridge N 141-N.

The downstream bridge 141 includes a slot (not illustrated), and an input/output device is inserted into the slot of the downstream bridge 141. The downstream bridge 141 generates an input/output packet conforming to a predetermined bus standard, and transmits/receives the input/output packet to/from the input/output device inserted into the slot. The upstream bridge 140 is connected to the CPU 13. Further, the upstream bridge 140 controls the downstream bridge 141 connected thereunder, and relays between the CPU 13 and the downstream bridge 141. Herein, the predetermined bus standard is, for example, PCI Express (see NPL 1).

FIG. 3 is a diagram illustrating a configuration example of configuration information stored in the configuration storage unit 15. The configuration storage unit 15 stores, for example, for each device, a bus number (B), a device number (D), and a function number (F) to which the device is allocated, device information, and information on presence/absence of an empty slot. Herein, the device is the upstream bridge 140, the downstream bridge 141, or an input/output device. The bus number (B) indicates a layer counted from the CPU 13 of the device. The device number (D) is a number assigned uniquely within an identical layer. The function number (F) is a uniquely assigned number when the device internally has a plurality of functions. Herein, the device information is control information read from the device, and is information to be used in a device driver and the like. The device information is, for example, an address and a type of a device.

An example in FIG. 3 illustrates configuration information in which the configuration in FIG. 1 is reflected. FIG. 3 indicates that (a downstream bridge A of) the bridge A 14-1 is connected to the NIC 6, and (a downstream bridge B of) the bridge A 14-1 is connected to the bridge B 14-2 on an identical layer 01. FIG. 3 further indicates that (a downstream bridge A of) the bridge B 14-2 is connected to the input/output device B 5 on a layer 02 one layer below the layer 01. As described above, in the configuration information stored in the configuration storage unit 15, a device tree configuration of the configuration management device 1 is reflected. Further, the configuration information stored in the configuration storage unit 15 is referred to by a device driver and the like. In FIG. 3, only a device to which the bridge 14 is connected is reflected in the configuration information, and the input/output device A 30 of the input/output box 3 to which the bridge 14 is not directly connected is not reflected in the configuration information.

<Configuration Control of Input/Output Device Connected to Bridge 14>

Figure 4:
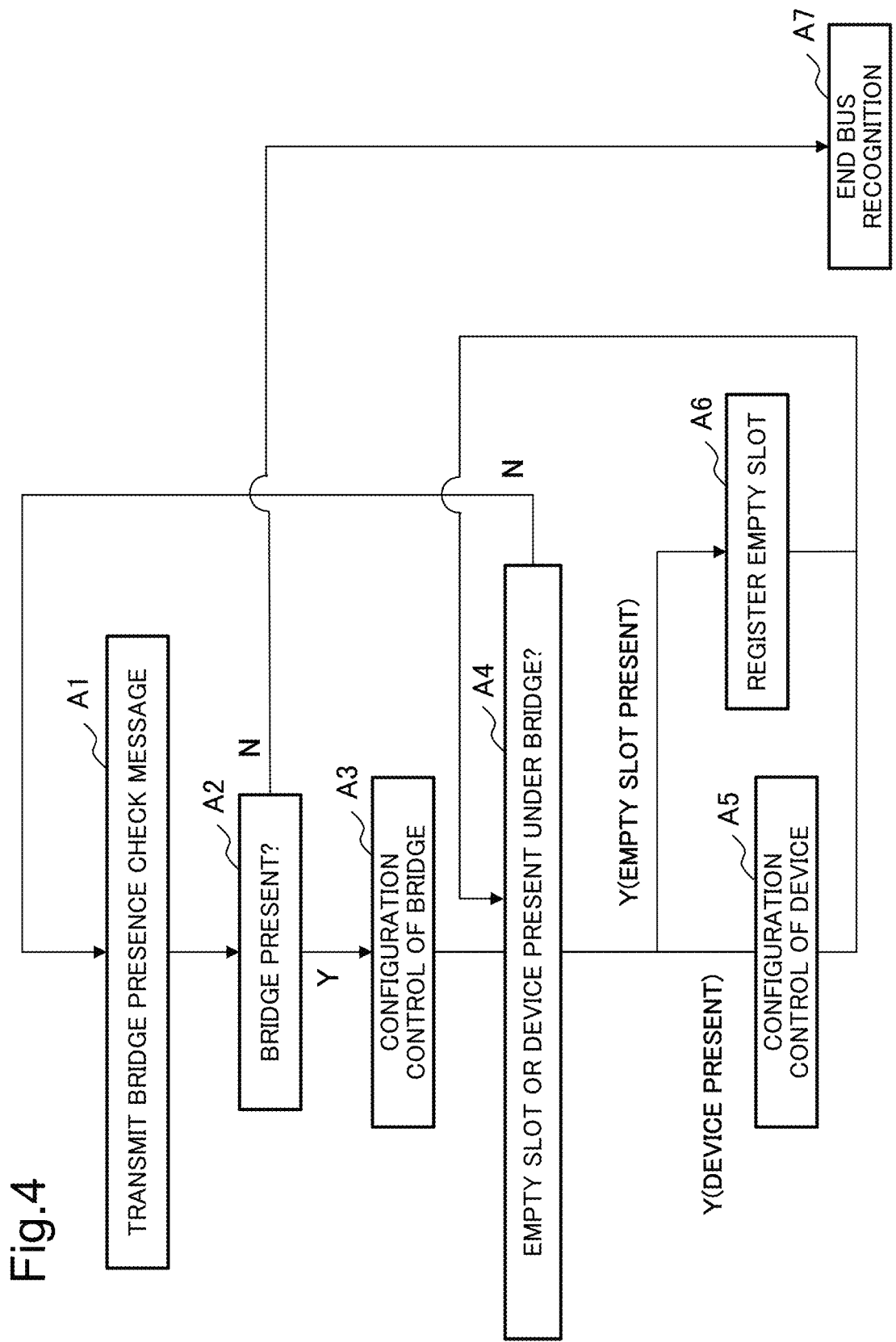
FIG. 4 is a flowchart of processing in which a bus recognition unit 10 reflects a configuration of a device connected to the bridge 14.
Figure 5:
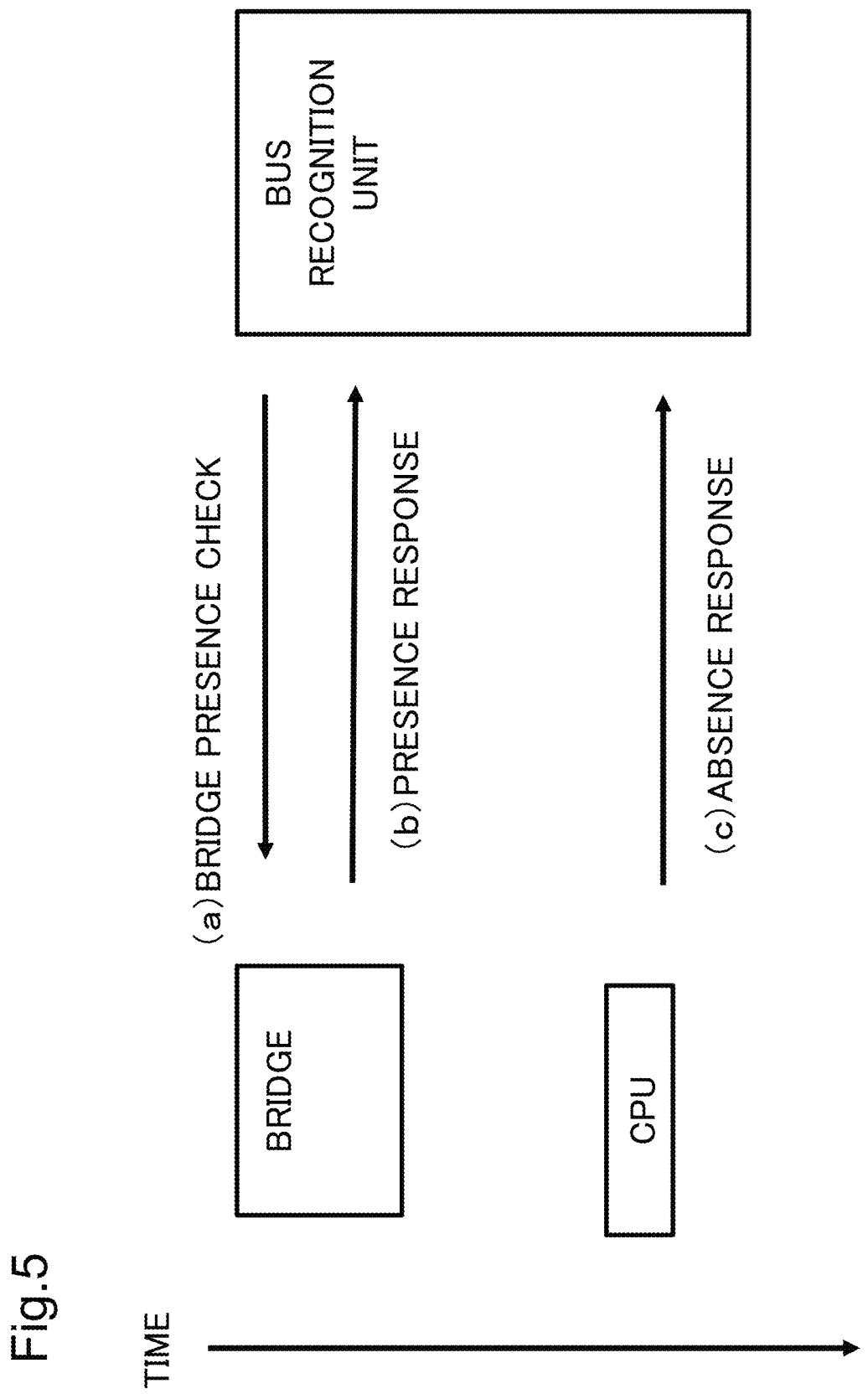
FIG. 5 is a diagram (No. 1) illustrating exchange of signals between the bus recognition unit 10 and a bridge and between the bus recognition unit 10 and an input/output device in the processing.
Figure 6:
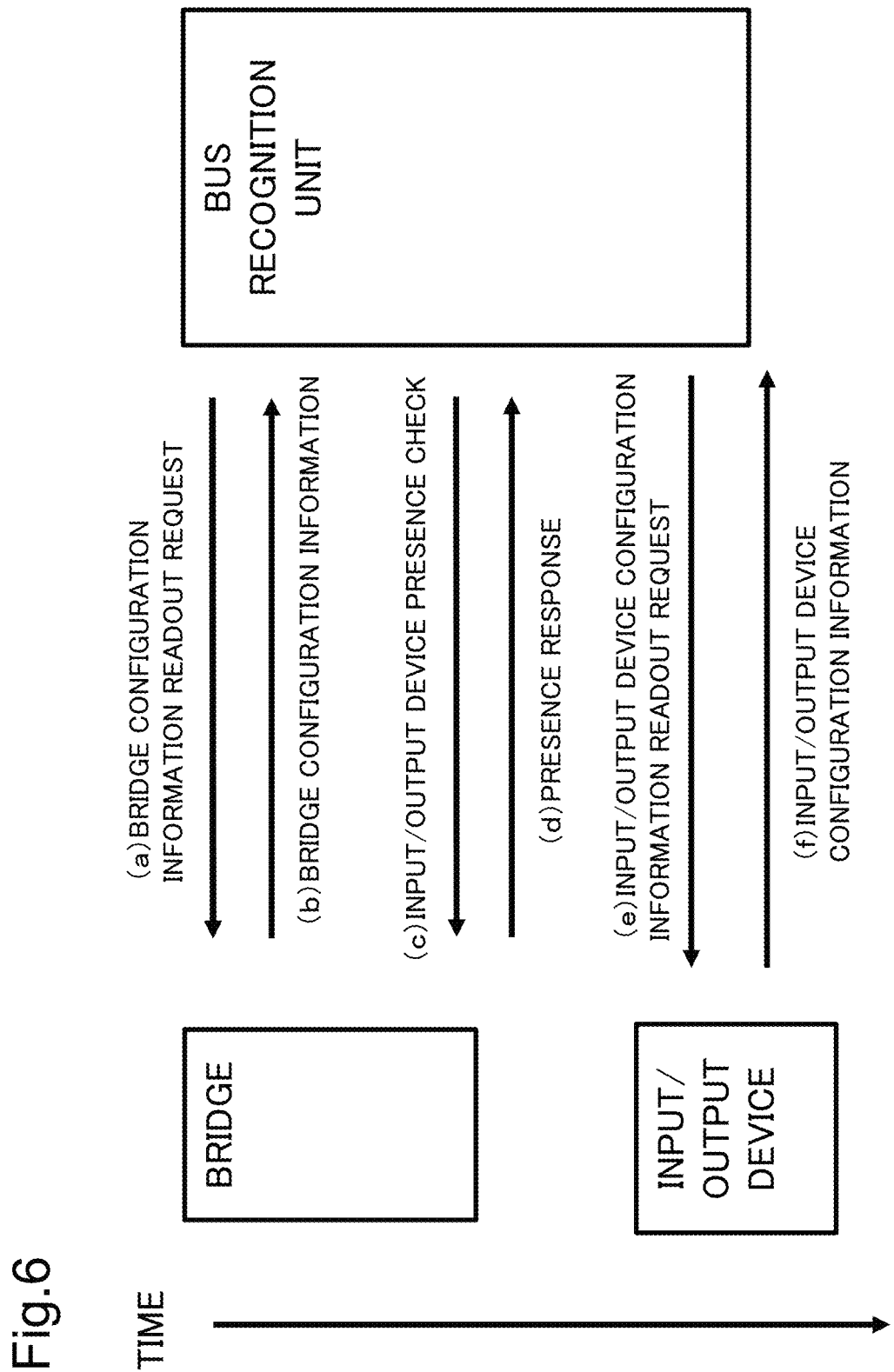
FIG. 6 is a diagram (No. 2) illustrating exchange of signals between the bus recognition unit 10 and a bridge and between the bus recognition unit 10 and an input/output device in the processing.

FIG. 4 is a flowchart of a processing wherein the bus recognition unit 10 reflects a configuration of a device connected to the bridge 14. FIGS. 5 and 6 are diagrams illustrating exchange of signals between the bus recognition unit 10 and a bridge and between the bus recognition unit 10 and an input/output device in the processing. The processing is, for example, processing of preparing the configuration information in FIG. 3 from the configuration of the configuration management device 1 illustrated in FIG. 1.

The bus recognition unit 10 automatically operates at a time of initial setting of the configuration management device 1. The bus recognition unit 10 may operate by being activated by an administrator or the like of the configuration management system 4 inputting a command. Upon starting an operation, the bus recognition unit 10 transmits a presence check message for the bridge 14, in order to check whether the bridge 14 is present on a bus connected to the CPU 13 operated by the bus recognition unit 10 (A1 in FIG. 4 and (a) in FIG. 5). The message has no destination set. Among the bridges 14 on which processing of configuration control has not been performed, the bridge 14 first receiving the message generates a presence response message ((b) in FIG. 5) indicating presence of the unprocessed bridge 14, and transmits the presence response message to the bus recognition unit 10. When the bridge 14 on which configuration control has not been performed is absent, the CPU 13 returns, to the bus recognition unit 10, an absence response indicating absence of the bridge 14 ((c) in FIG. 5). When, for example, there is no presence response to the presence check message within a predetermined period of time, the CPU 13 notifies the bus recognition unit 10 of the absence response as a timeout interrupt.

The bus recognition unit 10 refers to the received message, and checks whether the bridge 14 is present (A2). When the bus recognition unit 10 determines that the bridge 14 is present (Y in A2), the bus recognition unit 10 carries out configuration control of the bridge 14 (A3). At this time, the bus recognition unit 10 transmits, to the bridge 14 having transmitted the presence response, a read request ((a) in FIG. 6) for configuration information. Further, the bus recognition unit 10 receives, from the bridge 14, configuration information of the upstream bridge 140 and the downstream bridge 141 of the bridge 14 ((b) in FIG. 6). Furthermore, the bus recognition unit 10 assigns a bus number, a device number, and a function number to the upstream bridge 140 and the downstream bridges 141. A method of determining the number depends on implementation of the bus recognition unit 10. The bus recognition unit 10 registers, in the configuration storage unit 15, the configuration information received from the bridge 14 and the assigned bus number, the device number, and the function number.

Next, the bus recognition unit 10 inquires of the downstream bridge 141 on which configuration control has been performed in A3, whether an input/output device or an empty slot 16 is present (A4). Herein, the bus recognition unit 10 transmits an input/output device presence check message to the downstream bridge 141 ((c) in FIG. 6), and receives a presence response ((d) in FIG. 6) or an absence response. When receiving a presence response (Y in A4), the bus recognition unit 10 performs configuration control (A5) of the input/output device or registration (A6) of the empty slot 16. In the configuration control (A5) of the input/output device, the bus recognition unit 10 transmits, to the input/output device having transmitted the presence response, a read request ((e) in FIG. 6) for configuration information, and receives the configuration information from the input/output device ((f) in FIG. 6). Further, the bus recognition unit 10 assigns a bus number, a device number, and a function number to the input/output device. The bus recognition unit 10 registers, in the configuration storage unit 15, the configuration information received from the input/output device and the assigned bus number, the device number, and the function number.

In the registration (A6) of the empty slot 16, the bus recognition unit 10 registers the presence of the empty slot 16 (for example, "1" on the last row in FIG. 8) in information of the downstream bridge 141 stored in the configuration storage unit 15.

The bus recognition unit 10 repeats the processing of A4 to A6 as long as an input/output device is present under the bridge 14. When no device is present (N in A4), the bus recognition unit 10 returns to the processing of A1, and further repeats the processing of transmitting a presence check message ((a) in FIG. 5) for the bridge 14. When an absence response ((c) in FIG. 5) indicating absence of the bridge 14 is returned to the bus recognition unit 10 (N in A2), recognition performed by the bus recognition unit 10 ends (A7).

<Hot Plug Operation>

A hot plug operation indicates configuration control of an input/output device inserted during operation of the configuration management device 1.

Figure 7:
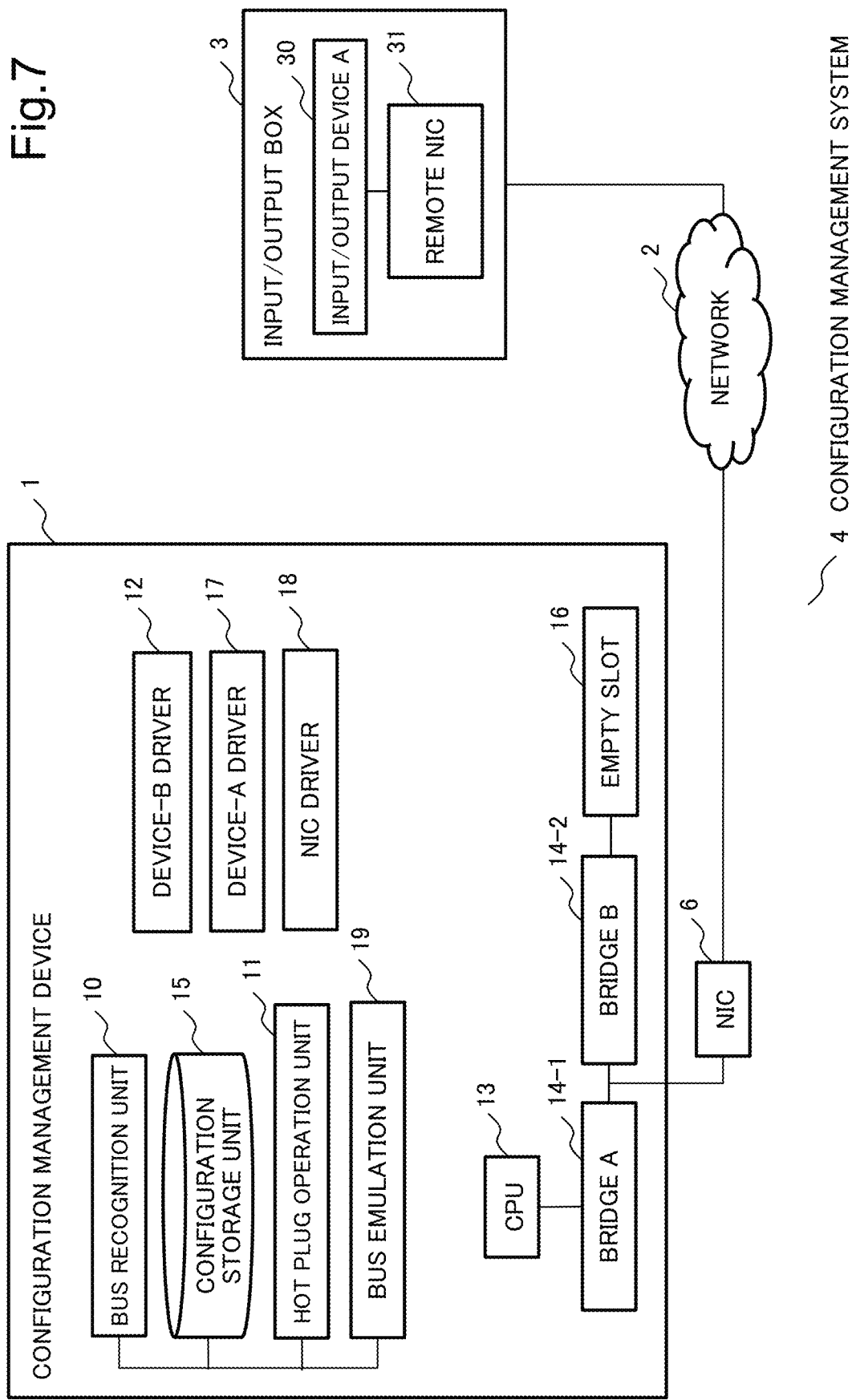
FIG. 7 is a diagram illustrating a configuration in which an input/output device B 5 is eliminated from (not connected to) a configuration of a configuration management device 1 illustrated in FIG. 1.

FIG. 7 is a diagram illustrating a configuration in which the input/output device B 5 is eliminated from (not connected to) the configuration of the configuration management device 1 illustrated in FIG. 1. In this case, the empty slot 16 is supposed to be present in the bridge B 14-2. In FIG. 7, the empty slot 16 is illustrated in order to clarify the presence thereof, rather than in order to mean that the empty slot 16 is connected to the bridge B 14-2. In this case, as illustrated in the last row in FIG. 8, the empty slot 16 is registered in association with the downstream bridge A 141-1 of the bridge B 14-2 in the configuration storage unit 15, as described above.

Figure 9:
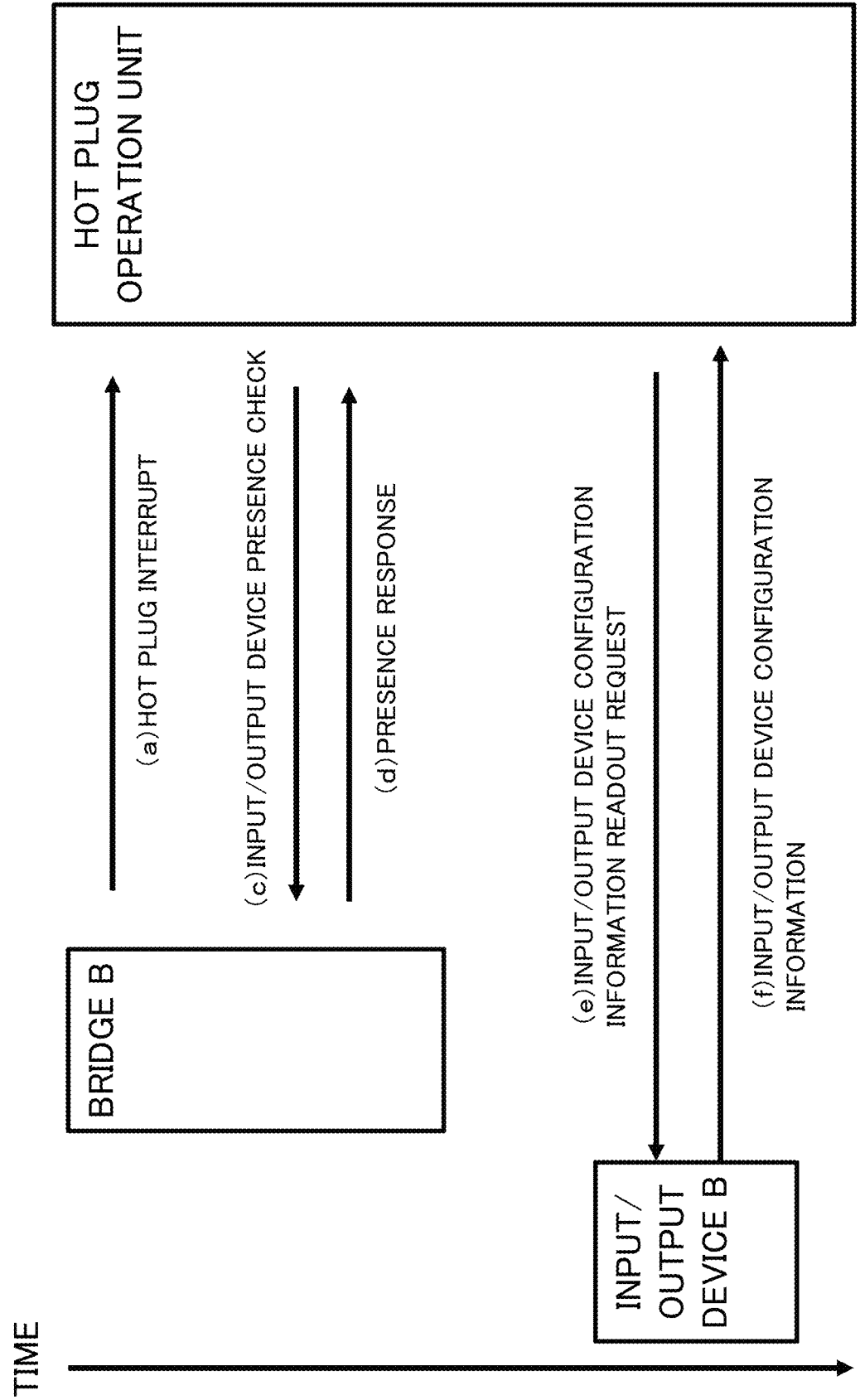
FIG. 9 is a diagram illustrating exchange of signals between a hot plug operation unit 11 and a bridge B 14-2 and between the hot plug operation unit 11 and the input/output device B 5 when the input/output device B 5 is inserted into an empty slot 16 during operation of the configuration management device 1.

FIG. 9 is a diagram illustrating exchange of signals between the hot plug operation unit 11 and the bridge B 14-2 and between the hot plug operation unit 11 and the input/output device B 5 when the input/output device B 5 is inserted into the empty slot 16 during operation of the configuration management device 1.

When the input/output device B 5 is inserted into the empty slot 16, the upstream bridge 140 of the bridge B 14-2 having received notification from the downstream bridge A 141-1 generates a hot plug interrupt in the CPU 13, and activates the hot plug operation unit 11 ((a) in FIG. 9). The activated hot plug operation unit 11 performs processing similar to A4 and A5 performed by the bus recognition unit 10 in the flowchart of FIG. 4.

In other words, the hot plug operation unit 11 inquires of the downstream bridge 141 from which device insertion has been reported as an interrupt, whether an input/output device is present. Herein, the hot plug operation unit 11 transmits an input/output device presence check message to the downstream bridge 141 ((c) in FIG. 9). Further, the hot plug operation unit 11 receives a presence response ((d) in FIG. 9) of the input/output device B 5. The hot plug operation unit 11 having received the presence response performs configuration control of the input/output device B 5. Herein, the hot plug operation unit 11 transmits, to the output device B 5, a read request ((e) in FIG. 9) for configuration information. Further, the hot plug operation unit 11 receives, from the input/output device, configuration information of the input/output device ((f) in FIG. 9). Furthermore, the hot plug operation unit 11 assigns a bus number, a device number, and a function number to the input/output device B 5. The hot plug operation unit 11 registers, in the configuration storage unit 15, the configuration information received from the input/output device B 5 and the assigned bus number, the device number, and the function number. Finally, the hot plug operation unit 11 deletes registration of the empty slot 16 registered in the configuration storage unit 15. Consequently, the configuration information illustrated in FIG. 3 described earlier is stored in the configuration storage unit 15.

<Configuration of Bus Emulation Unit 19>

Through the operation of the bus recognition unit 10 or the hot plug operation unit 11 described above, the configuration information in FIG. 3 is stored in the configuration storage unit 15 from the configuration of the configuration management device 1 in FIG. 1. However, in the processing performed by the bus recognition unit 10 or the hot plug operation unit 11, the input/output device A 30 connected ahead the NIC 6 via the network 2 is not reflected in the configuration storage unit 15.

In view of the above, in the configuration management device 1 according to the present example embodiment, the bus emulation unit 19 intercepts a presence response ((b) in FIG. 5) notified from the bridge 14 and an absence response ((c) in FIG. 5) notified from the CPU 13, and behaves as if the bridge 14 is virtually present. Further, the bus emulation unit 19 emulates generation of a hot plug interrupt ((a) in FIG. 9), and behaves as if the bridge 14 is virtually present.

Figure 10:
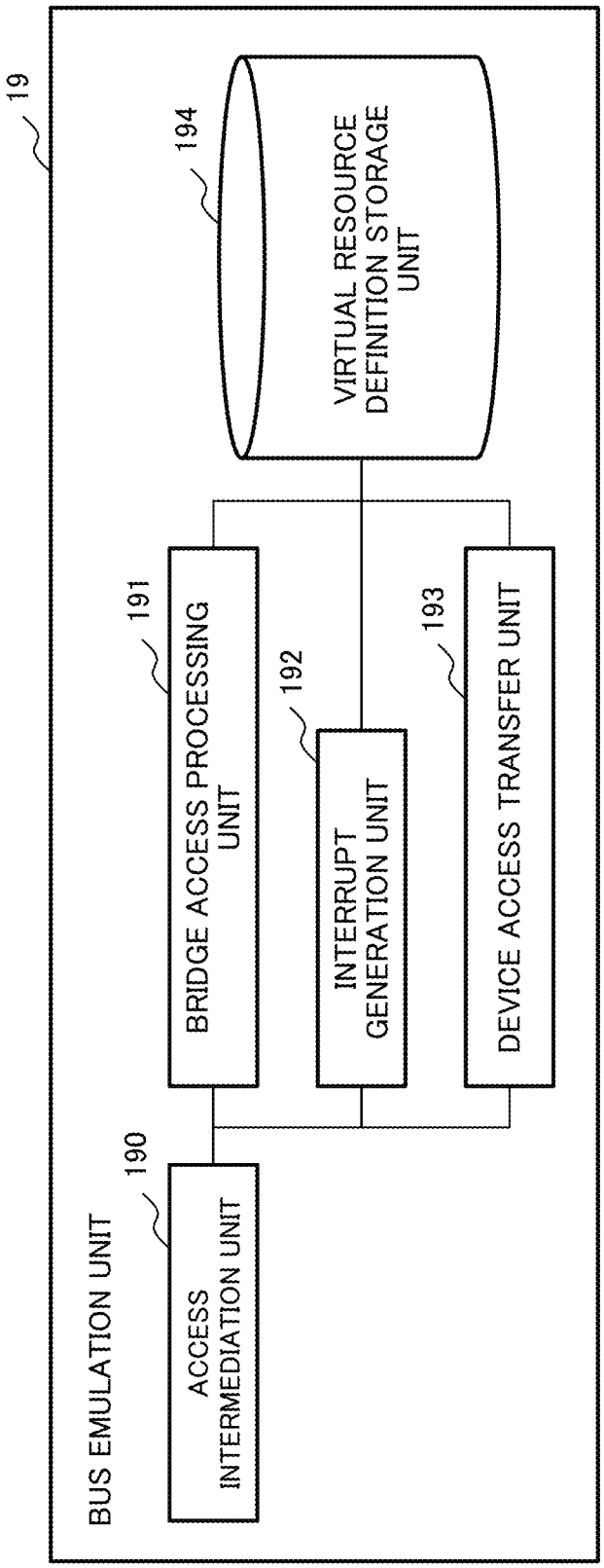
FIG. 10 is a diagram illustrating a configuration of a bus emulation unit 19.

FIG. 10 is a diagram illustrating a configuration of the bus emulation unit 19. The bus emulation unit 19 includes an access intermediation unit 190, a bridge access processing unit 191, an interrupt generation unit 192, a device access transfer unit 193, and a virtual resource definition storage unit 194.

The access intermediation unit 190 receives a check response by detecting an interrupt generated at a time of communication of a presence response or an absence response of the bridge 14, and notifies the bus recognition unit 10 and the like of the check response. In the following description, both of the presence response and the absence response of the bridge 14 will be sometimes called a check response, collectively. Further, the access intermediation unit 190 detects an interrupt generated at a time of data transmission to the bridge 14 and an input/output device performed by the bus recognition unit 10 and the hot plug operation unit 11, and transfers the interrupt to the bridge access processing unit 191 and the device access transfer unit 193. The access intermediation unit 190 is activated from an interrupt processing routine of an OS and or the like of the configuration management device 1.

The bridge access processing unit 191 receives, from the access intermediation unit 190, data transmission to the bridge 14 issued by the bus recognition unit 10 and the hot plug operation unit 11, and emulates an operation of the bridge 14. The device access transfer unit 193 receives, from the access intermediation unit 190, data transmission to an input/output device issued by the bus recognition unit 10 and the hot plug operation unit 11, and emulates an operation of the input/output device. At this time, the device access transfer unit 193 accesses the input/output device A 30 within the input/output box 3 via the NIC 6 and the network 2.

The interrupt generation unit 192 emulates a hot plug interrupt generated by the downstream bridge 141 when an input/output device is inserted into the empty slot 16 of the downstream bridge 141. The interrupt generation unit 192 stores, in an interrupt information storage area of the configuration management device 1, information (for example, information specifying the downstream bridge 141 having generated an interrupt) set at a time of a hot plug interrupt, and activates the hot plug operation unit 11. The virtual resource definition storage unit 194 stores configuration information of the bridge 14 emulated by the bus emulation unit 19 and information managing the input/output device A 30 connected to the network 2 via the NIC 6.

The access intermediation unit 190, the bridge access processing unit 191, the interrupt generation unit 192, and the device access transfer unit 193 are programs read and executed by the CPU 13, and are stored in, for example, a memory (not illustrated) included in the configuration management device 1. The virtual resource definition storage unit 194 is a semiconductor memory device or an HDD. The access intermediation unit 190, the bridge access processing unit 191, the interrupt generation unit 192, and the device access transfer unit 193 may be a dedicated processing device or a logic circuitry controlled by firmware.

FIG. 11 is a diagram illustrating a configuration of a bridge information table 1940 stored in the virtual resource definition storage unit 194. The bridge information table holds bridge information of the virtual bridge 14 (hereinafter, a virtual bridge) the operation of which is emulated by the bus emulation unit 19, and a configuration complete flag. The bridge information is configuration information of a virtual bridge. FIG. 11 indicates that a defined virtual bridge includes one downstream bridge 141 (a downstream bridge A) under the upstream bridge 140. The bridge information table may define a plurality of virtual bridges, and a virtual bridge may include a plurality of downstream bridges 141. The configuration complete flag indicates whether configuration control of the upstream bridges 140 and the downstream bridge 141 of a virtual bridge is performed ("1") or not performed ("0") by the bus recognition unit 10.

In FIG. 11, virtual bridges as many as the number preliminarily needed by a user are input in columns of the bridge information. Flag values are set, by the bus emulation unit 19, in columns of the configuration complete flag. An initial value is "0" indicating that configuration is not completed.

FIG. 12 is a diagram illustrating a configuration of a device information table 1941 stored in the virtual resource definition storage unit 194. The device information table 1941 defines, for each input/output device to be emulated by the bus emulation unit 19, with which downstream bridge 141 of which virtual bridge the input/output device is virtually connected. In other words, the device information table 1941 defines a virtual connection between a virtual bridge and an input/output device (for example, the input/output device A 30) connected to a connection means other than the bridge 14.

The device information table 1941 stores a device name, a device bus/device/function (BDF) number, and a network (NW) address, for each downstream bridge 141 of the virtual bridge for which the virtual connection is defined. The device name is a name of the input/output device A 30. The device BDF number is a bus/device/function number of the input/output device A. The NW address is an address (for example, an address on the network 2) of a connection means to which the input/output device A 30 is connected. Herein, the address is an address of the remote NIC 31 within the input/output box 3 in which the input/output device A 30 is stored.

Various kinds of information registered in the device information table 1941 are preliminarily registered by a user. However, in the device BDF number, a bus number, a device number, and a function number numbered by the bus recognition unit 10 are stored by the bus emulation unit 19. In an example in FIG. 12, as illustrated in a column of the device BDF number, "04" is related to the bus number, "00" is related to the device number, and "1" is related to the function number. For distinguishment of the numbers, ":" is inserted between "04" and "00", and "." is inserted between "00" and "1".

<Operation of Bus Emulation Unit 19>

Figure 13:
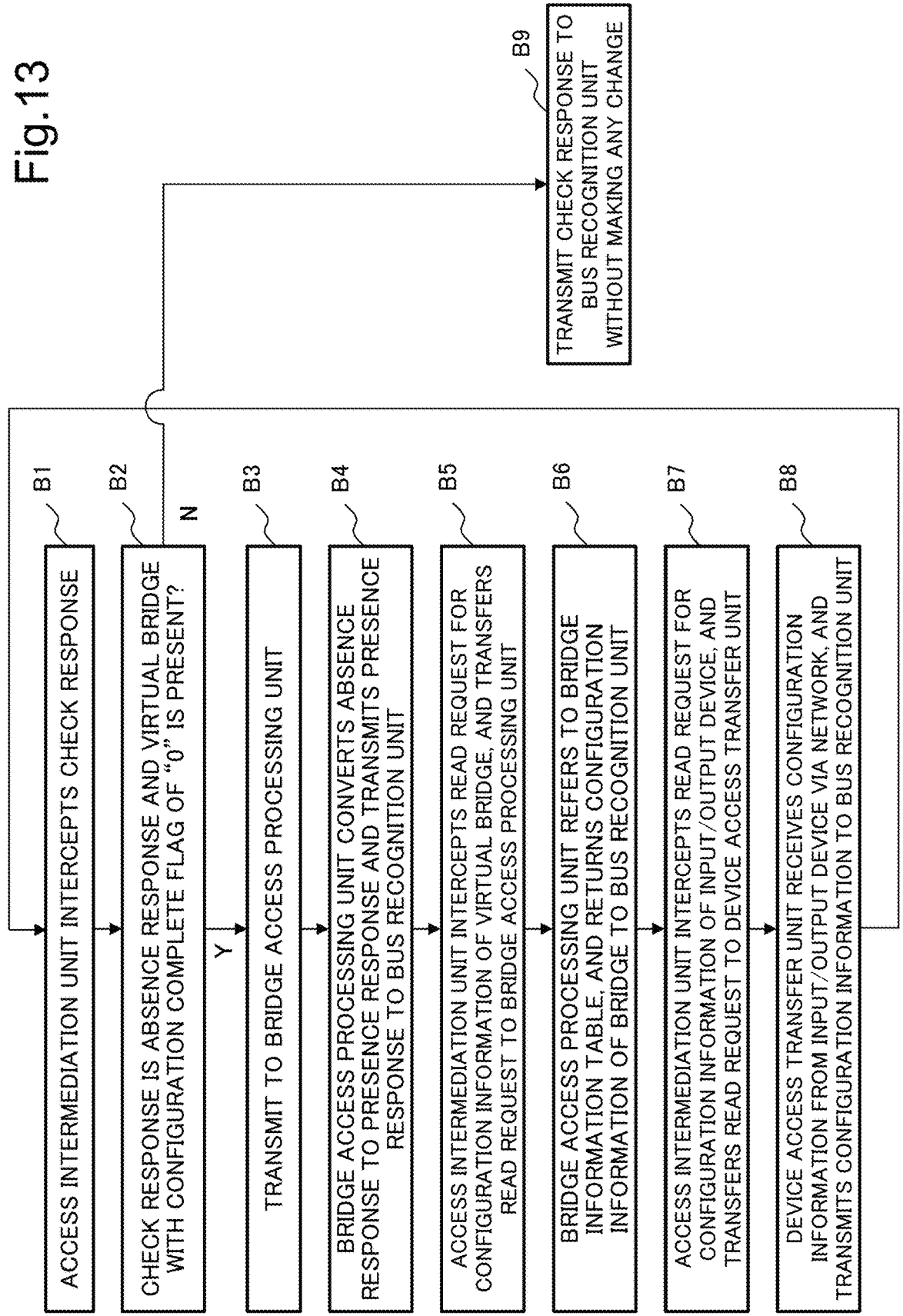
FIG. 13 is an operation flowchart of the bus emulation unit 19.
Figure 14:
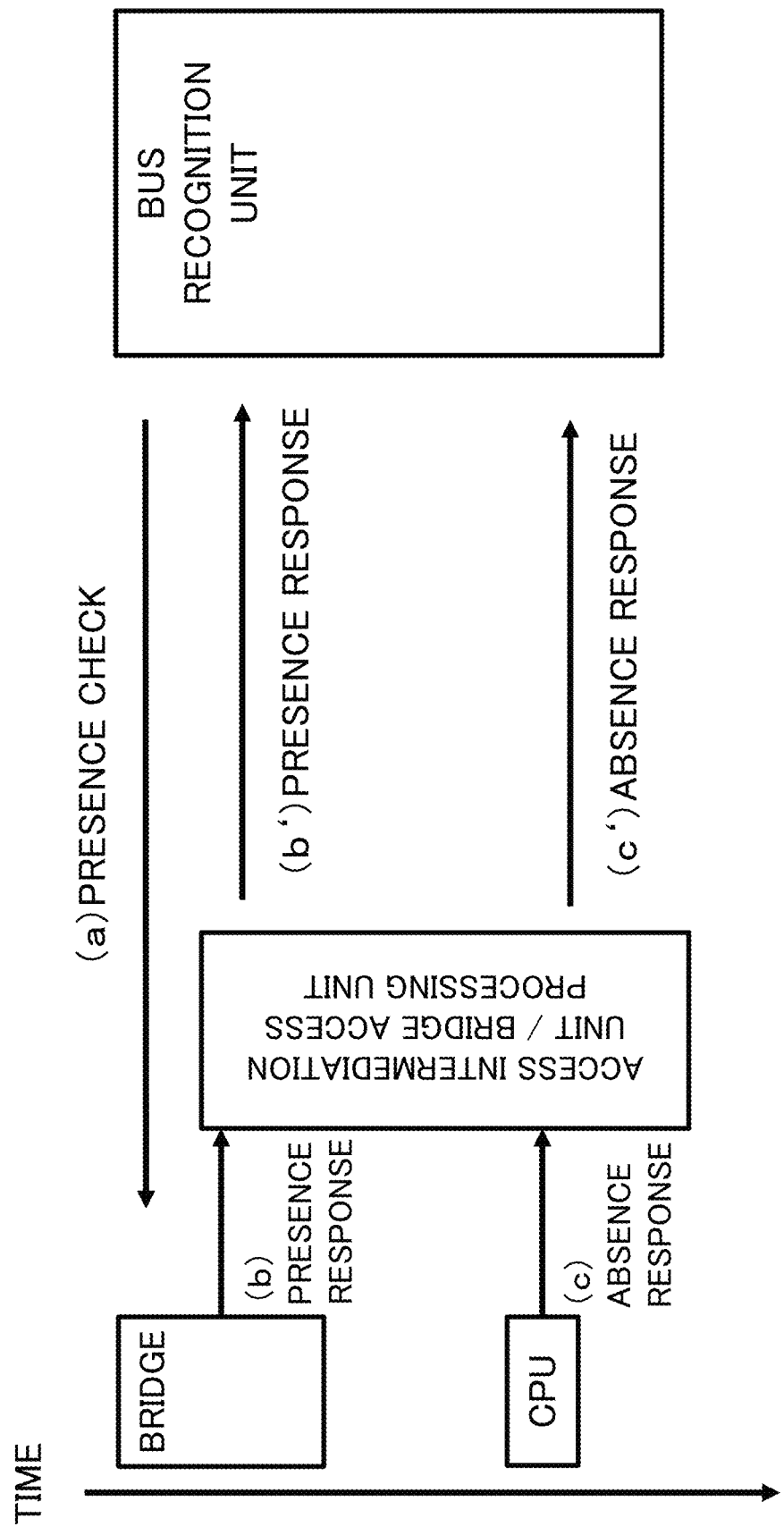
FIG. 14 is a diagram (No. 1) illustrating exchange of signals between the bus recognition unit 10 and the bus emulation unit 19 in the processing.
Figure 15:
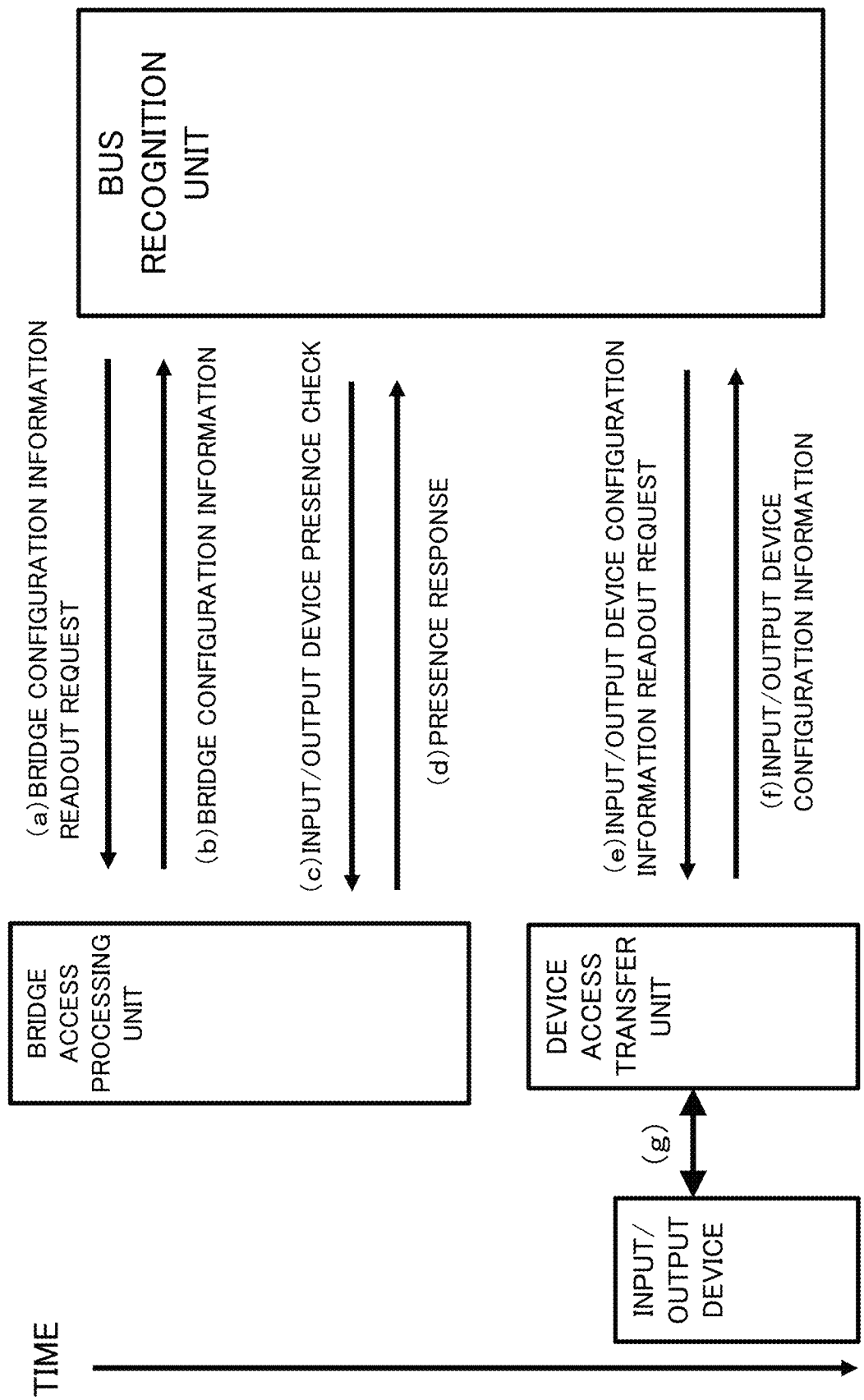
FIG. 15 is a diagram (No. 2) illustrating exchange of signals between the bus recognition unit 10 and the bus emulation unit 19 in the processing.

FIG. 13 is an operation flowchart of the bus emulation unit 19. The bus emulation unit 19 emulates an operation of a bus for the bus recognition unit 10 and the hot plug operation unit 11. FIGS. 14 and 15 are diagrams illustrating exchange of signals between the bus recognition unit 10 and the bus emulation unit 19 in the processing. The processing is, for example, processing of preparing configuration information as if the input/output device A 30 of the configuration management device 1 illustrated in FIG. 1 is connected to a virtual bridge.

In this process, the bus recognition unit 10 and the hot plug operation unit 11 operate in a way as already described by using FIG. 4 and the like. In other words, operations of the bus recognition unit 10 and the hot plug operation unit 11 are not different between when an input/output device is connected to the network 2 and when an input/output device is connected to the bridge 14. The bus recognition unit 10 and the hot plug operation unit 11 may use, without making any change, an item used in a system in which the bus emulation unit 19 is absent.

First, the bus recognition unit 10 starts an operation, and transmits a presence check message ((a) in FIG. 14) of the bridge 14 (A1 in FIG. 4). In response thereto, when an absence response ((c) in FIG. 14) is returned from the CPU 13 to the bus recognition unit 10, recognition performed by the bus recognition unit 10 ends (N in A2, and A7). In view of this, the access intermediation unit 190 of the bus emulation unit 19 intercepts a presence response and an absence response ((b) and (c) in FIG. 14) (B1 in FIG. 13). In other words, the access intermediation unit 190 intercepts and holds a check response, and prevents the check response from directly reaching the bus recognition unit 10.

(Case 1)

The access intermediation unit 190 refers to the intercepted check response. When the intercepted check response is a presence response (N in B2 in FIG. 13), the access intermediation unit 190 transmits the presence response to the bus recognition unit 10 without making any change (B9 in FIG. 13 and (b') in FIG. 14). When the check response is intercepted by the access intermediation unit 190 by using an interrupt at a time of communication of the check response, the access intermediation unit 190 transmits a presence response by emulating the interrupt. In other words, the access intermediation unit 190 activates an interrupt generation processing unit (not illustrated) of the bus recognition unit 10 without making any change in information set upon generation of an interrupt.

(Case 2)

When the check response is an absence response and a virtual bridge on which configuration control has not been performed (having a configuration complete flag of "0") is present within the bridge information table 1940 (Y in B2 in FIG. 13), the access intermediation unit 190 transmits the absence response to the bridge access processing unit 191 (B3 in FIG. 13). The bridge access processing unit 191 converts the received absence response into a presence response, and transmits the presence response converted from the absence response to the bus recognition unit 10 (B4). Specifically, the bridge access processing unit 191 sets interrupt information indicating that the bridge 14 from which an interrupt is generated is the virtual bridge, and activates the interrupt generation processing unit of the bus recognition unit 10.

The access intermediation unit 190 generates, as a formal connection destination of the virtual bridge, the virtual downstream bridge 141 of the bridge 14 set by a parameter at a time of activation. Then, the access intermediation unit 190 registers the virtual downstream bridge 141 in the configuration storage unit 15 (FIG. 16).

(Case 3)

When the check response is an absence response and no virtual bridge on which configuration control has not been performed is present within the bridge information table 1940 (N in B2 in FIG. 13), the access intermediation unit 190 transmits the absence response to the bus recognition unit 10 without making any change (B9 in FIG. 13 and (c') in FIG. 14).

In other words, while the bus emulation unit 19 changes an absence response into a presence response from a virtual bridge in Case 2, the bus emulation unit 19 transfers a received check response to the bus recognition unit 10 without making any change in other cases.

In Case 2, the bus recognition unit 10 having received a presence response from a virtual bridge carries out configuration control of the bridge 14 (in this case, the virtual bridge) having transmitted the presence response in A3 in FIG. 4. At this time, the bus recognition unit 10 transmits, to the bridge 14 (in this case, the virtual bridge) having transmitted the presence response, a read request (FIG. 15 (*a*)) for configuration information. Then, the bus recognition unit 10 receives, from the bridge 14, configuration information of the upstream bridge 140 and the downstream bridge 141 of the bridge 14 (FIG. 15 (*b*)).

However, with an interrupt at a time of transmission of a read request for configuration information as a trigger, the access intermediation unit 190 intercepts a read request for configuration information of the bridge 14 (in this case, the virtual bridge), and transfers the read request to the bridge access processing unit 191 (B5 in FIG. 13). The bridge access processing unit 191 refers to the bridge information table 1940 of the virtual resource definition storage unit 194, and transmits configuration information of the bridge 14 to the bus recognition unit 10 (B6 in FIG. 13 and FIG. 15 (*b*)). Herein, the configuration information to be transmitted is, for example, information as illustrated by the bridge information in FIG. 11, and is information indicating presence of one upstream bridge 140 and one downstream bridge 141 (a downstream bridge A) within the virtual bridge. At this time, the bridge access processing unit 191 changes, within the bridge information table 1940, configuration complete flags of the upstream bridge 140 and the downstream bridge 141 of the virtual bridge into "1".

The bus recognition unit 10 having received the configuration information of the bridge 14 assigns a bus number, a device number, and a function number to the upstream bridge 140 and the downstream bridges 141 of the virtual bridge. The bus recognition unit 10 registers, in the configuration storage unit 15, the configuration information received from the bridge 14 and the assigned bus number, the device number, and the function number, and ends configuration control of the bridge (A3 in FIG. 4).

FIG. 16 illustrates information stored in the configuration storage unit 15 after a virtual bridge is registered by the bus recognition unit 10. FIG. 16 indicates that a virtual bridge including the upstream bridge 140 and a downstream bridge A is registered under the bridge B 14-2 in FIG. 1.

Next, the bus recognition unit 10 inquires of the downstream bridge 141 (in this case, the downstream bridge A of the virtual bridge) on which configuration control has been performed in A3, whether an input/output device or the empty slot 16 is present (A4 in FIG. 4). Herein, the bus recognition unit 10 transmits an input/output device presence check message to the downstream bridge 141 (FIG. 15 (*c*)).

The access intermediation unit 190 intercepts the message, and transmits the message to the bridge access processing unit 191. The bridge access processing unit 191 refers to the device information table 1941, detects presence of an input/output device virtually connected to the downstream bridge A of the virtual bridge, and transmits a presence response (FIG. 15 (*d*)) of the input/output device to the bus recognition unit 10.

When receiving a presence response (Y in A4 in FIG. 4), the bus recognition unit 10 performs configuration control of the input/output device (A5 in FIG. 4). In the configuration control of the input/output device (A5 in FIG. 4), the bus recognition unit 10 transmits, to the input/output device having transmitted the presence response, a read request (FIG. 15 (*e*)) for configuration information.

The access intermediation unit 190 intercepts the read request for the configuration information, and transmits the read request to the device access transfer unit 193 (B7 in FIG. 13). The device access transfer unit 193 transfers the received read request for the configuration information to the input/output device A 30 via the network 2, and receives a response thereto (FIG. 15 (*g*)). Further, the device access transfer unit 193 acquires configuration information from the input/output device A 30, and returns the configuration information to the bus recognition unit 10 (B8 in FIG. 13 and FIG. 15 (*f*)).

This transfer operation is executed as follows. First, the device access transfer unit 193 refers to a read request for configuration information, identifies BDF number information of a transmission-destination virtual bridge and an input/output device name, and acquires a NW address from the device information table 1941. The device access transfer unit 193 prepares an input/output packet conforming to a predetermined input/output bus standard (for example, a PCI Express standard) that is the same as that generated by the bridge 14 having received the read request for the configuration information. Then, the device access transfer unit 193 loads, as a payload, the input/output packet on a frame (for example, an Ethernet frame) for the network 2. The device access transfer unit 193 transmits, via the network 2, the frame for the network 2 to the NW address acquired from the device information table 1941.

The remote NIC 31 of the input/output box 3 receives the frame, extracts the input/output packet conforming to the input/output bus standard from the frame, and inputs the input/output packet to the input/output device A 30. When receiving, from the input/output device A 30, the input/output packet including the configuration information and the like and conforming to the predetermined input/output bus standard, the remote NIC 31 transmits the input/output packet by loading the input/output packet on a frame for the network 2 addressed to the NIC 6.

The device access transfer unit 193 extracts, from the frame for the network 2 transmitted by the remote NIC 31, the input/output packet including the configuration information and the like output by the input/output device A 30 and conforming to the predetermined input/output bus standard, and transmits the input/output packet to the bus recognition unit 10.

When receiving the configuration information of the input/output device A 30 from the device access transfer unit 193 (FIG. 15 (f)), the bus recognition unit 10 assigns a bus number, a device number, and a function number to the input/output device. The bus recognition unit 10 registers, in the configuration storage unit 15, the configuration information received from the input/output device and the assigned bus number, the device number, and the function number (A5 in FIG. 4).

FIG. 17 illustrates information stored in the configuration storage unit 15 after the input/output device A 30 is registered by the bus recognition unit 10. FIG. 17 indicates that the input/output device A 30 is registered under a downstream bridge A of a virtual bridge.

When there are a plurality of input/output boxes 3 (that is, when a plurality of input/output devices A 30 are present) within the configuration management system 4, the bus emulation unit 19 is as follows. First, an administrator or the like of the configuration management system 4 defines virtual bridges as many as the number of the input/output boxes 3 in the bridge information table 1940 of the virtual resource definition storage unit 194, and further defines input/output devices A 30 as many as the number of the virtual bridges in the device information table 1941. Then, the bus emulation unit 19 repeatedly executes, for each input/output device A 30, B1 to B8 of the flow in FIG. 13.

<Hot Plug Operation by Bus Emulation Unit 19>

During operation, when an input/output device (for example, the input/output device A 30) connected to the network 2 is virtually inserted into the empty slot 16 of a virtual bridge, the configuration management device 1 brings the input/output device A 30 into an enabled state by executing configuration control of the input/output device A 30. For this purpose, it is necessary that the empty slot 16 is defined for the downstream bridge 141 of the virtual bridge within configuration information in the configuration storage unit 15. Further, it is necessary that a virtual connection between the downstream bridge 141 and the input/output device connected to the network 2 is defined in the device information table 1941. FIG. 16 illustrates an example of the configuration storage unit 15 satisfying this condition. FIG. 12 illustrates an example of the device information table 1941 satisfying this condition.

FIG. 18 is a diagram illustrating exchange of signals between the hot plug operation unit 11 and the bus emulation unit 19. The present processing is started by, for example, activating the interrupt generation unit 192 of the bus emulation unit 19 by an administrator inputting a command, instead of "inserting the input/output device A 30 into the empty slot 16 of a virtual bridge". The command uses designation of the empty slot 16 of the virtual bridge as a parameter value. When being activated, the interrupt generation unit 192 generates, in an emulated way, a hot plug interrupt generated when an input/output device is inserted into the empty slot 16 of the virtual bridge (FIG. 18 (a)). Specifically, the interrupt generation unit 192 activates the hot plug operation unit 11 after setting the same interrupt information in the same area as those when the bridge 14 generates a hot plug interrupt. The interrupt information includes information of the downstream bridge 141 (in this case, a downstream bridge A of the virtual bridge) from which an interrupt is generated.

The activated hot plug operation unit 11 inquires of the downstream bridge 141 designated by the interrupt information, whether an input/output device is present. Herein, the hot plug operation unit 11 transmits an input/output device presence check message to the downstream bridge 141 (FIG. 18 (c)). Further, the hot plug operation unit 11 receives a presence response (FIG. 18 (d)) of the input/output device A 30.

Herein, the access intermediation unit 190 intercepts the input/output device presence message, and transmits the input/output device presence message to the bridge access processing unit 191. The bridge access processing unit 191 refers to the device information table 1941 in FIG. 12, detects presence of an input/output device virtually connected to the downstream bridge A of the virtual bridge, and transmits a presence response (FIG. 18 (d)) of the input/output device to the hot plug operation unit 11.

The hot plug operation unit 11 having received the presence response performs configuration control of the input/output device A 30. In this control, the hot plug operation unit 11 transmits, to the output device A 30, a readout request (a read request) (FIG. 18 (e)) for configuration information, and receives the configuration information from the input/output device (FIG. 18 (f)).

Herein, the access intermediation unit 190 intercepts the read request for the configuration information, and transmits the read request to the device access transfer unit 193. The device access transfer unit 193 transfers the arrived readout request for the configuration information to the input/output device A 30 via the network 2, receives a response thereto (FIG. 18 (g)), and acquires the configuration information from the input/output device A 30. Then, the device access transfer unit 193 returns the configuration information acquired from the input/output device A 30 to the hot plug operation unit 11 (FIG. 18 (f)). Details of the transfer operation are as described above (see FIG. 15).

The hot plug operation unit 11 having received the configuration information assigns a bus number, a device number, and a function number to the input/output device A 30. The hot plug operation unit 11 registers, in the configuration storage unit 15, the configuration information received from the input/output device A 30 and the assigned bus number, the device number, and the function number. Finally, the hot plug operation unit 11 deletes registration of the empty slot 16 registered in the configuration storage unit 15. Consequently, the configuration information illustrated in FIG. 17 described earlier is stored in the configuration storage unit 15.

Modification Example

The input/output box 3 may be connected to the configuration management device 1 by another interface, rather than via the NIC 6 or the network 2. For example, the input/output box 3 may be connected to the configuration management device 1 via an input/output control board conforming to a small computer system interface (SCSI) standard.

Advantageous Effect

According to the configuration management device 1 of the present example embodiment, the bus recognition unit 10 performing configuration control of an input/output device can configure and control an input/output device connected to a connection means other than the bridge 14 and an input/output device connected to the bridge 14 by using the same interface.

The reason is that the configuration storage unit 15 stores configuration information of a virtual bridge. The reason is also that the bus emulation unit 19 receives a read request (a read request for configuration information of an input/output device connected to the virtual bridge) transmitted by the bus recognition unit 10, and reads and returns configuration information from an input/output device virtually connected to the virtual bridge.

Herein, an input/output device connected to a connection means other than the bridge 14 is, for example, the input/output device A 30 connected to the network 2 in FIG. 1. An input/output device connected to the bridge 14 is, for example, the input/output device B 5.

The configuration management device 1 according to the present example embodiment enables the hot plug operation unit 11 performing a hot plug operation of an input/output device to perform a hot plug operation on an input/output device connected to a connection means other than the bridge 14 and on an input/output device connected to the bridge 14 by using the same interface.

The reason is that the configuration storage unit 15 stores configuration information of a virtual bridge. The reason is also that the bus emulation unit 19 receives a read request (a read request for configuration information of an input/output device connected to the virtual bridge) transmitted by the hot plug operation unit 11, and reads and returns configuration information from an input/output device virtually connected to the virtual bridge.

Consequently, the configuration management device 1 according to the present example embodiment improves a degree of freedom in arrangement of an input/output device in the configuration management system 4. The configuration management device 1 enables, for example, an input/output device connected to the bridge 14 to be changed into a connection via the network 2, without influence on the bus recognition unit 10 and the hot plug operation unit 11.

Further, the configuration management device 1 according to the present example embodiment also improves a degree of freedom in arrangement of an input/output device in the configuration management system 4 already in operation. The reason is that, for introduction of the bus emulation unit 19, it is unnecessary to change the bus recognition unit 10 and the hot plug operation unit 11 already in use.

Second Example Embodiment

FIG. 19 is a diagram illustrating a configuration of a configuration management device 1 according to the present example embodiment. The configuration management device 1 according to the present example embodiment includes a configuration storage unit 15, a bus recognition unit 10, a virtual resource definition storage unit 194, and a device access transfer unit 193.

The configuration storage unit 15 stores configuration information of a bridge including a virtual bridge and of an input/output device. The bus recognition unit 10 reads the configuration information of the input/output device connected to the bridge from the input/output device, and stores the configuration information in the configuration storage unit 15. The virtual resource definition storage unit 194 defines a virtual connection between the virtual bridge and an input/output device A 30 connected to a connection unit 21 other than the bridge.

The device access transfer unit 193 receives a read request (a read request for configuration information) transmitted by the bus recognition unit 10 (to the input/output device A 30 connected to the virtual bridge), reads the configuration information from the input/output device A 30 for which the virtual connection is defined, and transmits the configuration information to the bus recognition unit 10.

The configuration management device 1 according to the present example embodiment enables the bus recognition unit 10 performing configuration control of an input/output device to configure and control an input/output device connected to the connection unit 21 other than a bridge and an input/output device connected to a bridge 14 by using the same interface.

The reason is that the configuration storage unit 15 stores configuration information of a virtual bridge. The reason is also that the device access transfer unit 193 receives a read request for configuration information connected to the virtual bridge transmitted by the bus recognition unit 10, and reads and returns the configuration information from an input/output device virtually connected to the virtual bridge.

Herein, an input/output device connected to the connection unit 21 other than a bridge is, for example, the input/output device A 30 connected to the network 2 in FIG. 1. An input/output device connected to the bridge 14 is, for example, an input/output device B 5.

Consequently, the configuration management device 1 according to the present example embodiment can improve a degree of freedom in arrangement of an input/output device in a configuration management system 4. The configuration management device 1 enables, for example, an input/output device connected to the bridge 14 to be changed into a connection via the connection means 21 other than a bridge, without influence on the bus recognition unit 10 and a hot plug operation unit 11.

Further, the configuration management device 1 according to the present example embodiment also improves a degree of freedom in arrangement of an input/output device in the configuration management system 4 already in operation. The reason is that, for introduction of the device access transfer unit 193 and the virtual resource definition storage unit 194, it is unnecessary to change the bus recognition unit 10 and the hot plug operation unit 11 already in use.

The configuration management device 1 does not need to include the bridge 14 as a hardware device other than a virtual bridge and an input/output device connected to the bridge.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. This application is based upon and claims the benefit of priority from Japanese patent application No. 2017-243744, filed on Dec. 20, 2017, the disclosure of which is incorporated herein in its entirety by reference.

REFERENCE SIGNS LIST

1 Configuration management device
2 Network
3 Input/output box
4 Configuration management system 5 Input/output device B
6 NIC
10 Bus recognition unit
11 Hot plug operation unit
12 Device-B driver
13 CPU
14 Bridge
14-1 Bridge A
14-2 Bridge B
15 Configuration storage unit
16 Empty slot
17 Device-A driver
18 NIC driver
19 Bus emulation unit
21 Connection unit other than bridge
30 Input/output device A
31 Remote NIC
140 Upstream bridge
141 Downstream bridge
141-1 Downstream bridge A
141-2 Downstream bridge B
141-N Downstream bridge N
190 Access intermediation unit
191 Bridge access processing unit
192 Interrupt generation unit
193 Device access transfer unit
194 Virtual resource definition storage unit
1940 Bridge information table
1941 Device information table

What is claimed is:

1. A configuration management device comprising:
at least one memory storing instructions; and
at least one processor connected to the at least one memory and configured to execute the instructions to implement:
  a configuration storage unit storing configuration information of a bridge including a virtual bridge, of an input/output device inserted into a slot of the bridge, and of an input/output device connected to the virtual bridge;
  a bus recognition unit transmitting a presence check of the bridge;
  an access intermediation unit receiving a check response by detecting an interrupt generated when communicating the check response to intercept and to hold the check response, and to prevent the check response from directly reaching the bus recognition unit, when the check response indicates absence, changing the check response into a check response indicating presence of the virtual bridge and transmitting the check response to the bus recognition unit; and
  a virtual resource definition storage unit defining a virtual connection between the virtual bridge and the input/output device connected to a connection unit other than the bridge and storing the configuration information of the virtual bridge,
wherein the bus recognition unit receives the check response indicating presence, transmits a read request for the configuration information of the bridge to read the configuration information of the bridge from the bridge,
wherein the at least one processor is further configured to configured to execute the instructions to implement a bridge access processing unit receiving the read request for the configuration information of the bridge transmitted from the bus recognition unit to the virtual bridge, and transmitting the configuration information of the virtual bridge,
wherein the bus recognition unit stores the configuration information of the bridge in the configuration storage unit,
wherein the bus recognition unit transmits a read request for the configuration information of the input/output device to the input/output device, reads the configuration information of the input/output device which is inserted into the slot of the bridge from the input/output device, and stores the configuration information of the input/output device in the configuration storage unit,
wherein the at least one processor is further configured to configured to execute the instructions to implement a device access transfer unit receiving the read request for the configuration information of the input/output device transmitted by the bus recognition unit with respect to the input/output device connected to the virtual bridge, reading the configuration information of the input/output device from the input/output device for which the virtual connection is defined, and transmitting the configuration information of the input/output device to the bus recognition unit, and
wherein the bus recognition unit stores the transmitted configuration information of the input/output device, which is connected to the virtual bridge, in the configuration storage unit.

2. The configuration management device according to claim 1, wherein the at least one processor is further configured to configured to execute the instructions to implement:
  a hot plug operation unit being activated at a time of generation of a hot plug interrupt generated by the bridge when the input/output device is connected, reading the configuration information from the input/output device connected to the bridge, and storing the configuration information in the configuration storage unit; and
  an interrupt generation unit activating the hot plug operation unit by emulating the hot plug interrupt generated by the virtual bridge, wherein
  the device access transfer unit receives a read request for the configuration information transmitted by the hot plug operation unit with respect to the input/output device connected to the virtual bridge, reads the configuration information from the input/output device for which the virtual connection is defined, and transmits the configuration information to the hot plug operation unit.

3. A configuration management system comprising:
the configuration management device according to claim 1, in which the bridge and the input/output device are connected by a bus conforming to a predetermined input/output bus standard; and
an input/output box that includes the input/output device and a remote bridge connecting the input/output device to a communication network, wherein
the device access transfer unit generates an input/output packet conforming to the predetermined input/output bus standard in response to a read request for the configuration information, and transmits the input/output packet by loading the input/output packet on a frame for the communication network, and the remote bridge extracts the input/output packet from the received frame for the communication network, and transmits the input/output packet to the input/output device.

4. The configuration management system according to claim 3, wherein
the device access transfer unit generates an input/output packet conforming to a PCI Express standard.

5. A configuration management method comprising:
providing a configuration storage unit storing configuration information of a bridge including a virtual bridge, of an input/output device inserted into a slot of the bridge, and of an input/output device connected to the virtual bridge;
providing a bus recognition unit transmitting a presence check of the bridge;
receiving a check response, with respect to the presence check of the bridge being transmitted by the bus recognition unit, by detecting an interrupt generated when communicating the check response to intercept and to hold the check response, and to prevent the check response from directly reaching the bus recognition unit, when the check response indicates absence, changing the check response into a check response indicating presence of the virtual bridge and transmitting the check response to the bus recognition unit;
defining a virtual connection between the virtual bridge and the input/output device connected to a connection unit other than the bridge and storing the configuration information of the virtual bridge;
receiving the check response indicating presence, and transmitting a read request for the configuration information of the bridge to read the configuration information of the bridge from the bridge;
receiving the read request for the configuration information of the bridge transmitted from the bus recognition unit to the virtual bridge, and transmitting the configuration information of the virtual bridge,
storing the configuration information of the bridge in the configuration storage unit;
transmitting a read request for the configuration information of the input/output device to the input/output device reading the configuration information of the input/output device which is inserted into the slot of the bridge from the input/output device, and storing the configuration information of the input/output device in the configuration storage unit;
receiving the read request for the configuration information of the input/output device transmitted by the bus recognition unit to the input/output device connected to the virtual bridge, reading the configuration information of the input/output device from the input/output device for which the virtual connection is defined, and transmitting the configuration information of the input/output device to the bus recognition unit; and
storing the transmitted configuration information of the input/output device, which is connected to the virtual bridge, in the configuration storage unit.

6. The configuration management method according to claim 5, further comprising:
providing a hot plug operation unit being activated at a time of generation of a hot plug interrupt generated by the bridge when the input/output device is connected, reading the configuration information from the input/output device connected to the bridge, and storing the configuration information in the configuration storage unit;
activating the hot plug operation unit by emulating the hot plug interrupt generated by the virtual bridge; and
receiving a read request for the configuration information transmitted by the hot plug operation unit with respect to the input/output device connected to the virtual bridge, reading the configuration information from the input/output device for which the virtual connection is defined, and transmitting the configuration information to the hot plug operation unit.

7. A non-transitory computer readable storage medium storing a configuration management program that causes a computer including
a configuration storage unit storing configuration information of a bridge including a virtual bridge, of an input/output device inserted into a slot of the bridge, and of an input/output device connected to the virtual bridge, and
a bus recognition unit transmitting a presence check of the bridge, to execute:
processing of receiving a check response by detecting an interrupt generated when communicating the check response to intercept and to hold the check response, and to prevent the check response from directly reaching the bus recognition unit, when the check response indicates absence, changing the check response into a check response indicating presence of the virtual bridge and transmitting the check response to the bus recognition unit,
virtual resource definition storage processing of defining a virtual connection between the virtual bridge and the input/output device connected to a connection unit other than the bridge and storing the configuration information of the virtual bridge,
processing of receiving the check response indicating presence, transmitting a read request for the configuration information of the bridge to read the configuration information of the bridge from the bridge,
processing of receiving the read request for the configuration information of the bridge transmitted from the bus recognition unit to the virtual bridge, and transmitting the configuration information of the virtual bridge,
processing of storing the configuration information of the bridge in the configuration storage unit, and
processing of transmitting a read request for the configuration information of the input/output device to the input/output device, reading the configuration information of the input/output device which is inserted into the slot of the bridge from the input/output device, and storing the configuration information of the input/output device in the configuration storage unit,
device access transfer processing of receiving the read request for the configuration information of the input/output device transmitted by the bus recognition unit with respect to the input/output device connected to the virtual bridge, reading the configuration information of the input/output device from the input/output device for which the virtual connection is defined, and transmitting the configuration information of the input/output device to the bus recognition unit,
processing of storing the transmitted configuration information of the input/output device, which is connected to the virtual bridge, in the configuration storage unit.

* * * * *